(12) United States Patent
Lee et al.

(10) Patent No.: US 12,507,178 B2
(45) Date of Patent: Dec. 23, 2025

(54) TRANSMISSION POWER MANAGEMENT FOR SIDELINK

(71) Applicant: LG ELECTRONICS INC., Seoul (KR)

(72) Inventors: Sangwook Lee, Seoul (KR); Seungmin Lee, Seoul (KR); Yoonoh Yang, Seoul (KR); Joongkwan Huh, Seoul (KR); Jinyup Hwang, Seoul (KR); Jinwoong Park, Seoul (KR); Yunsik Na, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 309 days.

(21) Appl. No.: 18/449,204

(22) Filed: Aug. 14, 2023

(65) Prior Publication Data

US 2024/0056985 A1  Feb. 15, 2024

Related U.S. Application Data

(60) Provisional application No. 63/422,454, filed on Nov. 4, 2022, provisional application No. 63/410,189, filed
(Continued)

(51) Int. Cl.
*H04W 52/32* (2009.01)
*H04W 72/232* (2023.01)
*H04W 72/25* (2023.01)

(52) U.S. Cl.
CPC ....... *H04W 52/325* (2013.01); *H04W 72/232* (2023.01); *H04W 72/25* (2023.01)

(58) Field of Classification Search
CPC ... H04W 52/32; H04W 52/325; H04W 72/25; H04W 72/232; H04L 1/0026; H04L 1/0029
See application file for complete search history.

(56) References Cited

U.S. PATENT DOCUMENTS 11,388,678 B2 * 7/2022 Ryu .................... H04W 52/241
11,424,871 B2 * 8/2022 Ryu .................. H04W 72/0453
(Continued)

FOREIGN PATENT DOCUMENTS

EP    4472114 A1 * 12/2024 ......... H04B 7/06954
EP    4572502 A1 *  6/2025 .......... H04W 52/325
(Continued)

*Primary Examiner* — Hai V Nguyen
(74) *Attorney, Agent, or Firm* — LEE, HONG, DEGERMAN, KANG & WAIMEY

(57) ABSTRACT

One disclosure of the present specification provides a method. The method comprises: determining a configured maximum output power; transmitting, to another UE, on a first resource pool and a second resource pool at a same time, based on the configured maximum output power, wherein the configured maximum output power is configured, based on a maximum transmission power for the first resource pool and a maximum transmission power for the second resource pool, wherein the maximum transmission power for the first resource pool is a maximum value of transmission power when sidelink transmission is performed only on the first resource pool, wherein the maximum transmission power for the second resource pool is a maximum value of transmission power when sidelink transmission is performed only on the second resource pool.

11 Claims, 8 Drawing Sheets

Related U.S. Application Data on Sep. 26, 2022, provisional application No. 63/398,205, filed on Aug. 15, 2022.

(56) References Cited

U.S. PATENT DOCUMENTS

| | | | | |
|---|---|---|---|---|
| 11,777,579 | B2* | 10/2023 | Lee | H04L 1/1896 |
| | | | | 370/252 |
| 11,805,486 | B2* | 10/2023 | Ryu | H04W 52/241 |
| 12,028,819 | B2* | 7/2024 | Ko | H04W 92/18 |
| 12,294,978 | B2* | 5/2025 | Ganesan | H04L 5/0053 |
| 12,295,019 | B2* | 5/2025 | Ryu | H04W 8/24 |
| 12,317,233 | B2* | 5/2025 | Ganesan | H04W 72/56 |
| 12,342,369 | B2* | 6/2025 | Lee | H04W 92/18 |
| 12,382,486 | B2* | 8/2025 | Lee | H04L 1/1812 |
| 2020/0351033 | A1* | 11/2020 | Ryu | H04L 1/1861 |
| 2020/0403737 | A1* | 12/2020 | Yeo | H04W 52/325 |
| 2020/0413348 | A1* | 12/2020 | Ryu | H04W 52/241 |
| 2021/0105728 | A1* | 4/2021 | Nguyen | H04L 1/1854 |
| 2021/0185685 | A1* | 6/2021 | Ryu | H04W 56/001 |
| 2021/0314933 | A1* | 10/2021 | Zhang | H04W 72/20 |
| 2022/0210747 | A1* | 6/2022 | Lee | H04W 92/18 |
| 2022/0217649 | A1* | 7/2022 | Lee | H04W 52/242 |
| 2022/0217655 | A1* | 7/2022 | Lee | H04W 52/343 |
| 2022/0225290 | A1* | 7/2022 | Ganesan | H04W 84/005 |
| 2022/0353825 | A1* | 11/2022 | Ryu | H04W 52/383 |
| 2022/0376761 | A1* | 11/2022 | Lee | H04L 5/005 |
| 2022/0377761 | A1* | 11/2022 | Lee | H04W 72/20 |
| 2022/0394698 | A1* | 12/2022 | Lee | H04W 52/281 |
| 2022/0407634 | A1* | 12/2022 | Ryu | H04L 1/1854 |
| 2023/0084917 | A1* | 3/2023 | Li | H04W 72/0446 |
| | | | | 370/329 |
| 2023/0102355 | A1* | 3/2023 | Nguyen | H04W 52/367 |
| | | | | 370/318 |
| 2023/0116674 | A1* | 4/2023 | Zhou | H04W 72/51 |
| | | | | 370/329 |
| 2023/0146928 | A1* | 5/2023 | Hwang | H04W 52/325 |
| | | | | 370/329 |
| 2023/0262660 | A1* | 8/2023 | Park | H04L 5/0094 |
| | | | | 370/329 |
| 2023/0300815 | A1* | 9/2023 | Li | H04L 1/1854 |
| 2023/0361933 | A1* | 11/2023 | Huang | H04L 1/1893 |
| 2023/0388871 | A1* | 11/2023 | Guo | H04W 36/0069 |
| 2024/0031945 | A1* | 1/2024 | Cheng | H04W 52/242 |
| 2024/0137961 | A1* | 4/2024 | Ryu | H04W 72/53 |
| 2024/0137970 | A1* | 4/2024 | Rastegardoost | H04W 72/40 |
| 2024/0196356 | A1* | 6/2024 | Wang | H04W 76/14 |
| 2024/0224237 | A1* | 7/2024 | Ganesan | H04W 72/563 |
| 2024/0276397 | A1* | 8/2024 | Farag | H04W 52/367 |
| 2024/0284343 | A1* | 8/2024 | Farag | H04W 52/245 |
| 2024/0284428 | A1* | 8/2024 | Farag | H04L 5/0048 |
| 2024/0292346 | A1* | 8/2024 | Elshafie | H02J 50/80 |
| 2024/0381387 | A1* | 11/2024 | Zhao | H04W 72/25 |
| 2025/0106872 | A1* | 3/2025 | Roth | H04L 5/0048 |
| 2025/0106894 | A1* | 3/2025 | Talarico | H04L 1/1861 |
| 2025/0142591 | A1* | 5/2025 | Yang | H04W 72/25 |
| 2025/0142595 | A1* | 5/2025 | Deng | H04W 72/0446 |
| 2025/0151086 | A1* | 5/2025 | Talarico | H04W 72/25 |
| 2025/0184922 | A1* | 6/2025 | Liu | H04W 52/383 |
| 2025/0227730 | A1* | 7/2025 | Jeon | H04W 72/566 |
| 2025/0227737 | A1* | 7/2025 | Talarico | H04L 1/1861 |
| 2025/0247858 | A1* | 7/2025 | Talarico | H04W 74/0808 |

FOREIGN PATENT DOCUMENTS

| | | | | |
|---|---|---|---|---|
| WO | WO-2023147204 | A1 * | 8/2023 | H04L 5/0053 |
| WO | WO-2023150443 | A1 * | 8/2023 | H04W 52/10 |
| WO | WO-2024211628 | A1 * | 10/2024 | H04L 5/0007 |

* cited by examiner

FIG. 7
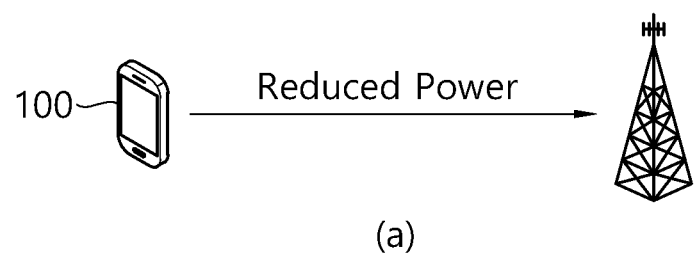
(a)
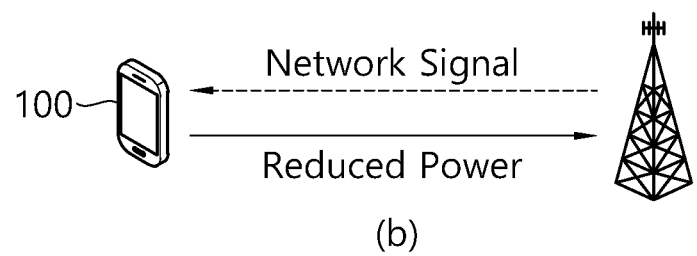
(b)

TRANSMISSION POWER MANAGEMENT FOR SIDELINK

CROSS-REFERENCE TO RELATED APPLICATIONS

Pursuant to 35 U.S.C. § 119(e), this application claims the benefit of U.S. Provisional Patent Application Nos. 63/398,205, filed on Aug. 15, 2022, 63/410,189, filed on Sep. 26, 2022, and 63/422,454, filed on Nov. 4, 2022, the contents of which are all hereby incorporated by reference herein in their entireties.

TECHNICAL FIELD

The present specification relates to mobile communications.

BACKGROUND

3rd generation partnership project (3GPP) long-term evolution (LTE) is a technology for enabling high-speed packet communications. Many schemes have been proposed for the LTE objective including those that aim to reduce user and provider costs, improve service quality, and expand and improve coverage and system capacity. The 3GPP LTE requires reduced cost per bit, increased service availability, flexible use of a frequency band, a simple structure, an open interface, and adequate power consumption of a terminal as an upper-level requirement.

Work has started in international telecommunication union (ITU) and 3GPP to develop requirements and specifications for new radio (NR) systems. 3GPP has to identify and develop the technology components needed for successfully standardizing the new RAT timely satisfying both the urgent market needs, and the more long-term requirements set forth by the ITU radio communication sector (ITU-R) international mobile telecommunications (IMT)-2020 process. Further, the NR should be able to use any spectrum band ranging at least up to 100 GHz that may be made available for wireless communications even in a more distant future.

The NR targets a single technical framework addressing all usage scenarios, requirements and deployment scenarios including enhanced mobile broadband (eMBB), massive machine-type-communications (mMTC), ultra-reliable and low latency communications (URLLC), etc. The NR shall be inherently forward compatible.

If the device transmits PSFCH using multiple resource pools, the device's configured maximum output power is an issue.

SUMMARY

Based on the maximum transmit power values for each of the multiple resource pools, the maximum output power of the terminal is determined.

BRIEF DESCRIPTION OF THE DRAWINGS

FIG. 7 illustrates an example of a method for limiting the transmit power of a terminal.

DETAILED DESCRIPTION

Figure 1:
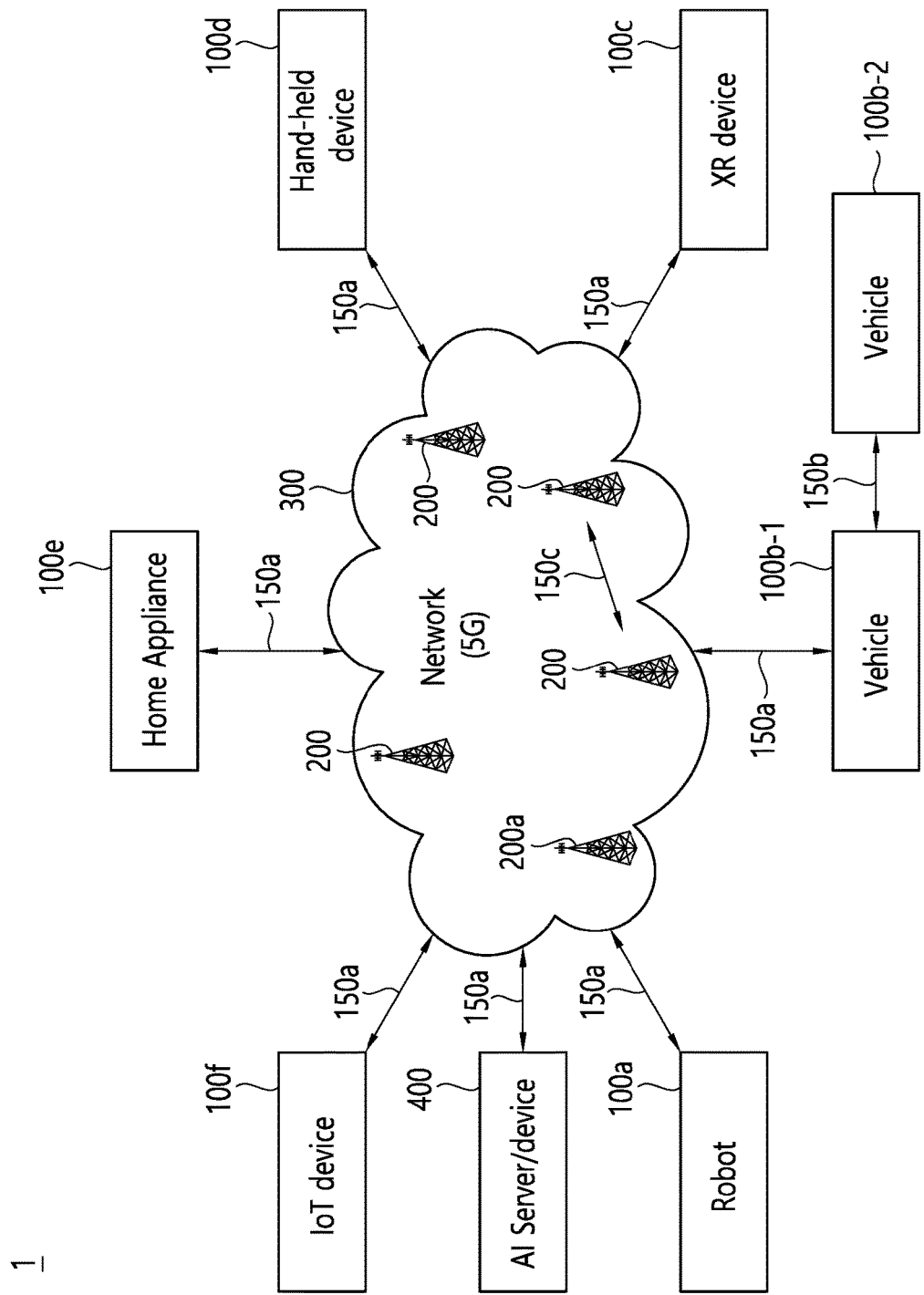
FIG. 1 shows an example of a communication system to which implementations of the present disclosure is applied.

The following techniques, apparatuses, and systems may be applied to a variety of wireless multiple access systems. Examples of the multiple access systems include a code division multiple access (CDMA) system, a frequency division multiple access (FDMA) system, a time division multiple access (TDMA) system, an orthogonal frequency division multiple access (OFDMA) system, a single carrier frequency division multiple access (SC-FDMA) system, and a multicarrier frequency division multiple access (MC-FDMA) system. CDMA may be embodied through radio technology such as universal terrestrial radio access (UTRA) or CDMA2000. TDMA may be embodied through radio technology such as global system for mobile communications (GSM), general packet radio service (GPRS), or enhanced data rates for GSM evolution (EDGE). OFDMA may be embodied through radio technology such as institute of electrical and electronics engineers (IEEE) 802.11 (Wi-Fi), IEEE 802.16 (WiMAX), IEEE 802.20, or evolved UTRA (E-UTRA). UTRA is a part of a universal mobile telecommunications system (UMTS). 3rd generation partnership project (3GPP) long term evolution (LTE) is a part of evolved UMTS (E-UMTS) using E-UTRA. 3GPP LTE employs OFDMA in DL and SC-FDMA in UL. Evolution of 3GPP LTE includes LTE-A (advanced), LTE-A Pro, and/or 5G NR (new radio).

For convenience of description, implementations of the present disclosure are mainly described in regards to a 3GPP based wireless communication system. However, the technical features of the present disclosure are not limited thereto. For example, although the following detailed description is given based on a mobile communication system corresponding to a 3GPP based wireless communication system, aspects of the present disclosure that are not limited to 3GPP based wireless communication system are applicable to other mobile communication systems.

For terms and technologies which are not specifically described among the terms of and technologies employed in the present disclosure, the wireless communication standard documents published before the present disclosure may be referenced.

In the present disclosure, "A or B" may mean "only A", "only B", or "both A and B". In other words, "A or B" in the present disclosure may be interpreted as "A and/or B". For example, "A, B or C" in the present disclosure may mean "only A", "only B", "only C", or "any combination of A, B and C".

In the present disclosure, slash (/) or comma (,) may mean "and/or". For example, "A/B" may mean "A and/or B". Accordingly, "A/B" may mean "only A", "only B", or "both A and B". For example, "A, B, C" may mean "A, B or C".

In the present disclosure, "at least one of A and B" may mean "only A", "only B" or "both A and B". In addition, the expression "at least one of A or B" or "at least one of A and/or B" in the present disclosure may be interpreted as same as "at least one of A and B".

In addition, in the present disclosure, "at least one of A, B and C" may mean "only A", "only B", "only C", or "any combination of A, B and C". In addition, "at least one of A, B or C" or "at least one of A, B and/or C" may mean "at least one of A, B and C".

Also, parentheses used in the present disclosure may mean "for example". In detail, when it is shown as "control information (PDCCH)", "PDCCH" may be proposed as an example of "control information". In other words, "control information" in the present disclosure is not limited to "PDCCH", and "PDCCH" may be proposed as an example of "control information". In addition, even when shown as "control information (i.e., PDCCH)", "PDCCH" may be proposed as an example of "control information".

Technical features that are separately described in one drawing in the present disclosure may be implemented separately or simultaneously.

Although not limited thereto, various descriptions, functions, procedures, suggestions, methods and/or operational flowcharts of the present disclosure disclosed herein can be applied to various fields requiring wireless communication and/or connection (e.g., 5G) between devices.

Hereinafter, the present disclosure will be described in more detail with reference to drawings. The same reference numerals in the following drawings and/or descriptions may refer to the same and/or corresponding hardware blocks, software blocks, and/or functional blocks unless otherwise indicated.

FIG. 1 Shows an Example of a Communication System to which Implementations Of the Present Disclosure is Applied.

The 5G usage scenarios shown in FIG. 1 are only exemplary, and the technical features of the present disclosure can be applied to other 5G usage scenarios which are not shown in FIG. 1.

Three main requirement categories for 5G include (1) a category of enhanced mobile broadband (eMBB), (2) a category of massive machine type communication (mMTC), and (3) a category of ultra-reliable and low latency communications (URLLC).

Referring to FIG. 1, the communication system 1 includes wireless devices 100a to 100f, base stations (BSs) 200, and a network 300. Although FIG. 1 illustrates a 5G network as an example of the network of the communication system 1, the implementations of the present disclosure are not limited to the 5G system, and can be applied to the future communication system beyond the 5G system.

The BSs 200 and the network 300 may be implemented as wireless devices and a specific wireless device may operate as a BS/network node with respect to other wireless devices.

The wireless devices 100a to 100f represent devices performing communication using radio access technology (RAT) (e.g., 5G new RAT (NR)) or LTE) and may be referred to as communication/radio/5G devices. The wireless devices 100a to 100f may include, without being limited to, a robot 100a, vehicles 100b-1 and 100b-2, an extended reality (XR) device 100c, a hand-held device 100d, a home appliance 100e, an IoT device 100f, and an artificial intelligence (AI) device/server 400. For example, the vehicles may include a vehicle having a wireless communication function, an autonomous driving vehicle, and a vehicle capable of performing communication between vehicles. The vehicles may include an unmanned aerial vehicle (UAV) (e.g., a drone). The XR device may include an AR/VR/Mixed Reality (MR) device and may be implemented in the form of a head-mounted device (HMD), a head-up display (HUD) mounted in a vehicle, a television, a smartphone, a computer, a wearable device, a home appliance device, a digital signage, a vehicle, a robot, etc. The hand-held device may include a smartphone, a smartpad, a wearable device (e.g., a smartwatch or a smartglasses), and a computer (e.g., a notebook). The home appliance may include a TV, a refrigerator, and a washing machine. The IoT device may include a sensor and a smartmeter.

In the present disclosure, the wireless devices 100a to 100f may be called user equipments (UEs). A UE may include, for example, a cellular phone, a smartphone, a laptop computer, a digital broadcast terminal, a personal digital assistant (PDA), a portable multimedia player (PMP), a navigation system, a slate personal computer (PC), a tablet PC, an ultrabook, a vehicle, a vehicle having an autonomous traveling function, a connected car, an UAV, an AI module, a robot, an AR device, a VR device, an MR device, a hologram device, a public safety device, an MTC device, an IoT device, a medical device, a FinTech device (or a financial device), a security device, a weather/environment device, a device related to a 5G service, or a device related to a fourth industrial revolution field.

The UAV may be, for example, an aircraft aviated by a wireless control signal without a human being onboard.

The VR device may include, for example, a device for implementing an object or a background of the virtual world. The AR device may include, for example, a device implemented by connecting an object or a background of the virtual world to an object or a background of the real world. The MR device may include, for example, a device implemented by merging an object or a background of the virtual world into an object or a background of the real world. The hologram device may include, for example, a device for implementing a stereoscopic image of 360 degrees by recording and reproducing stereoscopic information, using an interference phenomenon of light generated when two laser lights called holography meet.

The public safety device may include, for example, an image relay device or an image device that is wearable on the body of a user.

The MTC device and the IoT device may be, for example, devices that do not require direct human intervention or manipulation. For example, the MTC device and the IoT device may include smartmeters, vending machines, thermometers, smartbulbs, door locks, or various sensors.

The medical device may be, for example, a device used for the purpose of diagnosing, treating, relieving, curing, or preventing disease. For example, the medical device may be a device used for the purpose of diagnosing, treating, relieving, or correcting injury or impairment. For example, the medical device may be a device used for the purpose of inspecting, replacing, or modifying a structure or a function. For example, the medical device may be a device used for the purpose of adjusting pregnancy. For example, the medical device may include a device for treatment, a device for operation, a device for (in vitro) diagnosis, a hearing aid, or a device for procedure.

The security device may be, for example, a device installed to prevent a danger that may arise and to maintain safety. For example, the security device may be a camera, a closed-circuit TV (CCTV), a recorder, or a black box.

The FinTech device may be, for example, a device capable of providing a financial service such as mobile payment. For example, the FinTech device may include a payment device or a point of sales (POS) system.

The weather/environment device may include, for example, a device for monitoring or predicting a weather/environment.

The wireless devices 100a to 100f may be connected to the network 300 via the BSs 200. An AI technology may be applied to the wireless devices 100a to 100f and the wireless devices 100a to 100f may be connected to the AI server 400 via the network 300. The network 300 may be configured using a 3G network, a 4G (e.g., LTE) network, a 5G (e.g., NR) network, and a beyond-5G network. Although the wireless devices 100a to 100f may communicate with each other through the BSs 200/network 300, the wireless devices 100a to 100f may perform direct communication (e.g., sidelink communication) with each other without passing through the BSs 200/network 300. For example, the vehicles 100b-1 and 100b-2 may perform direct communication (e.g., vehicle-to-vehicle (V2V)/vehicle-to-everything (V2X) communication). The IoT device (e.g., a sensor) may perform direct communication with other IoT devices (e.g., sensors) or other wireless devices 100a to 100f.

Wireless communication/connections 150a, 150b and 150c may be established between the wireless devices 100a to 100f and/or between wireless device 100a to 100f and BS 200 and/or between BSs 200. Herein, the wireless communication/connections may be established through various RATs (e.g., 5G NR) such as uplink/downlink communication 150a, sidelink communication (or device-to-device (D2D) communication) 150b, inter-base station communication 150c (e.g., relay, integrated access and backhaul (IAB)), etc. The wireless devices 100a to 100f and the BSs 200/the wireless devices 100a to 100f may transmit/receive radio signals to/from each other through the wireless communication/connections 150a, 150b and 150c. For example, the wireless communication/connections 150a, 150b and 150c may transmit/receive signals through various physical channels. To this end, at least a part of various configuration information configuring processes, various signal processing processes (e.g., channel encoding/decoding, modulation/demodulation, and resource mapping/de-mapping), and resource allocating processes, for transmitting/receiving radio signals, may be performed based on the various proposals of the present disclosure.

AI refers to the field of studying artificial intelligence or the methodology that can create it, and machine learning refers to the field of defining various problems addressed in the field of AI and the field of methodology to solve them. Machine learning is also defined as an algorithm that increases the performance of a task through steady experience on a task.

Robot means a machine that automatically processes or operates a given task by its own ability. In particular, robots with the ability to recognize the environment and make self-determination to perform actions can be called intelligent robots. Robots can be classified as industrial, medical, home, military, etc., depending on the purpose or area of use. The robot can perform a variety of physical operations, such as moving the robot joints with actuators or motors. The movable robot also includes wheels, brakes, propellers, etc., on the drive, allowing it to drive on the ground or fly in the air.

Autonomous driving means a technology that drives on its own, and autonomous vehicles mean vehicles that drive without user's control or with minimal user's control. For example, autonomous driving may include maintaining lanes in motion, automatically adjusting speed such as adaptive cruise control, automatic driving along a set route, and automatically setting a route when a destination is set.

The vehicle covers vehicles equipped with internal combustion engines, hybrid vehicles equipped with internal combustion engines and electric motors, and electric vehicles equipped with electric motors, and may include trains, motorcycles, etc., as well as cars. Autonomous vehicles can be seen as robots with autonomous driving functions.

Extended reality is collectively referred to as VR, AR, and MR. VR technology provides objects and backgrounds of real world only through computer graphic (CG) images. AR technology provides a virtual CG image on top of a real object image. MR technology is a CG technology that combines and combines virtual objects into the real world. MR technology is similar to AR technology in that they show real and virtual objects together. However, there is a difference in that in AR technology, virtual objects are used as complementary forms to real objects, while in MR technology, virtual objects and real objects are used as equal personalities.

NR supports multiples numerologies (and/or multiple subcarrier spacings (SCS)) to support various 5G services. For example, if SCS is 15 kHz, wide area can be supported in traditional cellular bands, and if SCS is 30 kHz/60 kHz, dense-urban, lower latency, and wider carrier bandwidth can be supported. If SCS is 60 kHz or higher, bandwidths greater than 24.25 GHz can be supported to overcome phase noise.

The NR frequency band may be defined as two types of frequency range, i.e., FR1 and FR2. The numerical value of the frequency range may be changed. For example, the frequency ranges of the two types (FR1 and FR2) may be as shown in Table 1 below. For ease of explanation, in the frequency ranges used in the NR system, FR1 may mean "sub 6 GHz range", FR2 may mean "above 6 GHz range," and may be referred to as millimeter wave (mmW).

TABLE 1

| Frequency Range designation | Corresponding frequency range | Subcarrier Spacing |
| --- | --- | --- |
| FR1 | 450 MHz-6000 MHz | 15, 30, 60 kHz |
| FR2 | 24250 MHz-52600 MHz | 60, 120, 240 kHz |

As mentioned above, the numerical value of the frequency range of the NR system may be changed. For example, FR1 may include a frequency band of 410 MHz to 7125 MHz as shown in Table 2 below. That is, FR1 may include a frequency band of 6 GHz (or 5850, 5900, 5925 MHz, etc.) or more. For example, a frequency band of 6 GHz (or 5850, 5900, 5925 MHz, etc.) or more included in FR1 may include an unlicensed band. Unlicensed bands may be used for a variety of purposes, for example for communication for vehicles (e.g., autonomous driving).

TABLE 2

| Frequency Range designation | Corresponding frequency range | Subcarrier Spacing |
| --- | --- | --- |
| FR1 | 410 MHz-125 MHz | 15, 30, 60 kHz |
| FR2 | 24250 MHz-52600 MHz | 60, 120, 240 kHz |

Here, the radio communication technologies implemented in the wireless devices in the present disclosure may include narrowband internet-of-things (NB-IoT) technology for low-power communication as well as LTE, NR and 6G. For example, NB-IoT technology may be an example of low power wide area network (LPWAN) technology, may be implemented in specifications such as LTE Cat NB1 and/or LTE Cat NB2, and may not be limited to the above-mentioned names. Additionally and/or alternatively, the radio communication technologies implemented in the wireless devices in the present disclosure may communicate based on LTE-M technology. For example, LTE-M technology may be an example of LPWAN technology and be called by various names such as enhanced machine type communication (eMTC). For example, LTE-M technology may be implemented in at least one of the various specifications, such as 1) LTE Cat 0, 2) LTE Cat M1, 3) LTE Cat M2, 4) LTE non-bandwidth limited (non-BL), 5) LTE-MTC, 6) LTE Machine Type Communication, and/or 7) LTE M, and may not be limited to the above-mentioned names. Additionally and/or alternatively, the radio communication technologies implemented in the wireless devices in the present disclosure may include at least one of ZigBee, Bluetooth, and/or LPWAN which take into account low-power communication, and may not be limited to the above-mentioned names. For example, ZigBee technology may generate personal area networks (PANs) associated with small/low-power digital communication based on various specifications such as IEEE 802.15.4 and may be called various names.

Figure 2:
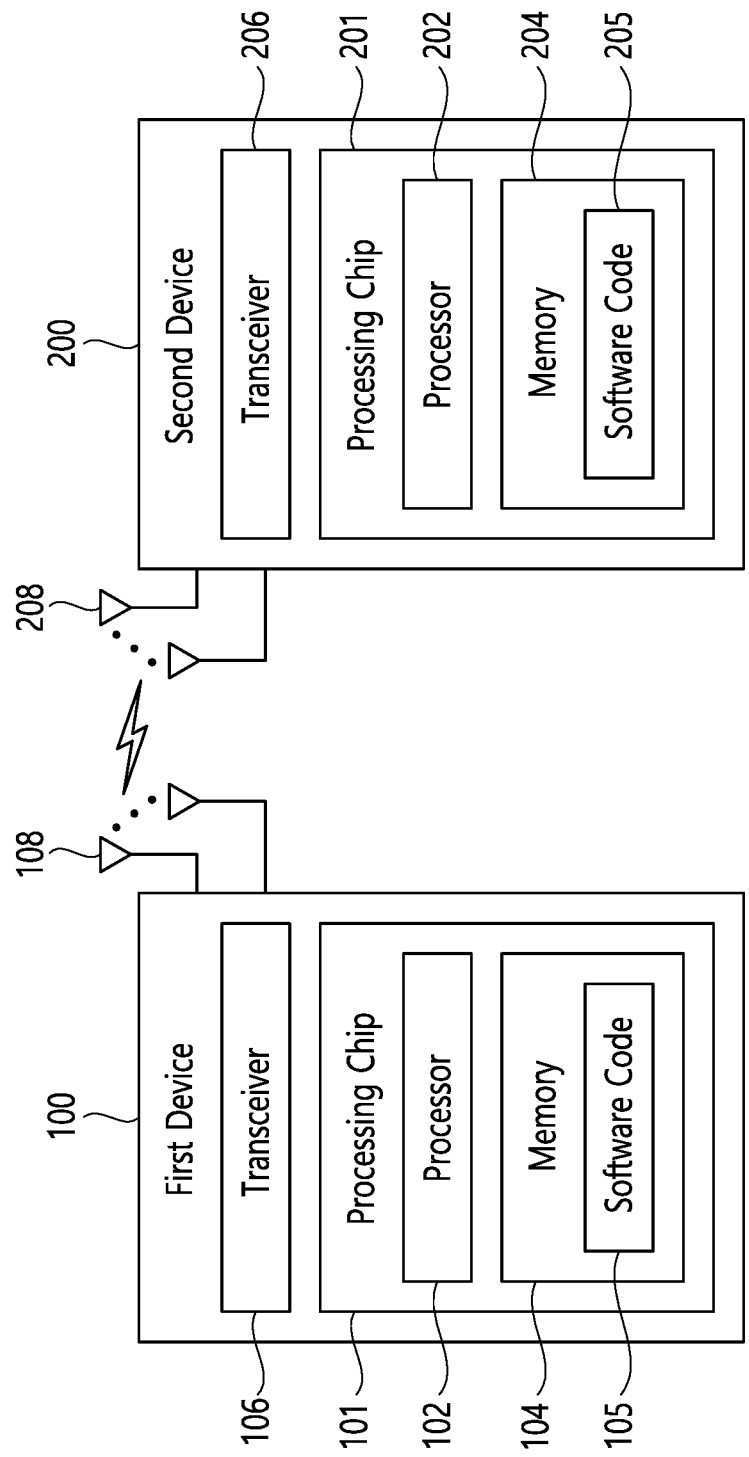
FIG. 2 shows an example of wireless devices to which implementations of the present disclosure is applied.

FIG. 2 Shows an Example of Wireless Devices to which Implementations of the Present Disclosure is Applied.

In FIG. 2, The first wireless device 100 and/or the second wireless device 200 may be implemented in various forms according to use cases/services. For example, {the first wireless device 100 and the second wireless device 200} may correspond to at least one of {the wireless device 100a to 100f and the BS 200}, {the wireless device 100a to 100f and the wireless device 100a to 100f} and/or {the BS 200 and the BS 200} of FIG. 1. The first wireless device 100 and/or the second wireless device 200 may be configured by various elements, devices/parts, and/or modules.

The first wireless device 100 may include at least one transceiver, such as a transceiver 106, at least one processing chip, such as a processing chip 101, and/or one or more antennas 108.

The processing chip 101 may include at least one processor, such a processor 102, and at least one memory, such as a memory 104. Additional and/or alternatively, the memory 104 may be placed outside of the processing chip 101.

The processor 102 may control the memory 104 and/or the transceiver 106 and may be adapted to implement the descriptions, functions, procedures, suggestions, methods and/or operational flowcharts described in the present disclosure. For example, the processor 102 may process information within the memory 104 to generate first information/signals and then transmit radio signals including the first information/signals through the transceiver 106. The processor 102 may receive radio signals including second information/signals through the transceiver 106 and then store information obtained by processing the second information/signals in the memory 104.

The memory 104 may be operably connectable to the processor 102. The memory 104 may store various types of information and/or instructions. The memory 104 may store a firmware and/or a software code 105 which implements codes, commands, and/or a set of commands that, when executed by the processor 102, perform the descriptions, functions, procedures, suggestions, methods and/or operational flowcharts disclosed in the present disclosure. For example, the firmware and/or the software code 105 may implement instructions that, when executed by the processor 102, perform the descriptions, functions, procedures, suggestions, methods and/or operational flowcharts disclosed in the present disclosure. For example, the firmware and/or the software code 105 may control the processor 102 to perform one or more protocols. For example, the firmware and/or the software code 105 may control the processor 102 to perform one or more layers of the radio interface protocol.

Herein, the processor 102 and the memory 104 may be a part of a communication modem/circuit/chip designed to implement RAT (e.g., LTE or NR). The transceiver 106 may be connected to the processor 102 and transmit and/or receive radio signals through one or more antennas 108. Each of the transceiver 106 may include a transmitter and/or a receiver. The transceiver 106 may be interchangeably used with Radio Frequency (RF) unit(s). In the present disclosure, the first wireless device 100 may represent a communication modem/circuit/chip.

The second wireless device 200 may include at least one transceiver, such as a transceiver 206, at least one processing chip, such as a processing chip 201, and/or one or more antennas 208.

The processing chip 201 may include at least one processor, such a processor 202, and at least one memory, such as a memory 204. Additional and/or alternatively, the memory 204 may be placed outside of the processing chip 201.

The processor 202 may control the memory 204 and/or the transceiver 206 and may be adapted to implement the descriptions, functions, procedures, suggestions, methods and/or operational flowcharts described in the present disclosure. For example, the processor 202 may process information within the memory 204 to generate third information/signals and then transmit radio signals including the third information/signals through the transceiver 206. The processor 202 may receive radio signals including fourth information/signals through the transceiver 106 and then store information obtained by processing the fourth information/signals in the memory 204.

The memory 204 may be operably connectable to the processor 202. The memory 204 may store various types of information and/or instructions. The memory 204 may store a firmware and/or a software code 205 which implements codes, commands, and/or a set of commands that, when executed by the processor 202, perform the descriptions, functions, procedures, suggestions, methods and/or operational flowcharts disclosed in the present disclosure. For example, the firmware and/or the software code 205 may implement instructions that, when executed by the processor 202, perform the descriptions, functions, procedures, suggestions, methods and/or operational flowcharts disclosed in the present disclosure. For example, the firmware and/or the software code 205 may control the processor 202 to perform one or more protocols. For example, the firmware and/or the software code 205 may control the processor 202 to perform one or more layers of the radio interface protocol.

Herein, the processor 202 and the memory 204 may be a part of a communication modem/circuit/chip designed to implement RAT (e.g., LTE or NR). The transceiver 206 may be connected to the processor 202 and transmit and/or receive radio signals through one or more antennas 208. Each of the transceiver 206 may include a transmitter and/or a receiver. The transceiver 206 may be interchangeably used with RF unit. In the present disclosure, the second wireless device 200 may represent a communication modem/circuit/chip.

Hereinafter, hardware elements of the wireless devices 100 and 200 will be described more specifically. One or more protocol layers may be implemented by, without being limited to, one or more processors 102 and 202. For example, the one or more processors 102 and 202 may implement one or more layers (e.g., functional layers such as Physical (PHY) layer, Media Access Control (MAC) layer, Radio Link Control (RLC) layer, Packet Data Convergence Protocol (PDCP) layer, Radio Resource Control (RRC) layer, and Service Data Adaptation Protocol (SDAP) layer). The one or more processors 102 and 202 may generate one or more Protocol Data Units (PDUs), one or more Service Data Unit (SDUs), messages, control information, data, or information according to the descriptions, functions, procedures, suggestions, methods and/or operational flowcharts disclosed in the present disclosure. The one or more processors 102 and 202 may generate signals (e.g., baseband signals) including PDUs, SDUs, messages, control information, data, or information according to the descriptions, functions, procedures, suggestions, methods and/or operational flowcharts disclosed in the present disclosure and provide the generated signals to the one or more transceivers 106 and 206. The one or more processors 102 and 202 may receive the signals (e.g., baseband signals) from the one or more transceivers 106 and 206 and acquire the PDUs, SDUs, messages, control information, data, or information according to the descriptions, functions, procedures, suggestions, methods and/or operational flowcharts disclosed in the present disclosure.

The one or more processors 102 and 202 may be referred to as controllers, microcontrollers, microprocessors, or microcomputers. The one or more processors 102 and 202 may be implemented by hardware, firmware, software, or a combination thereof. As an example, one or more Application Specific Integrated Circuits (ASICs), one or more Digital Signal Processors (DSPs), one or more Digital Signal Processing Devices (DSPDs), one or more Programmable Logic Devices (PLDs), or one or more Field Programmable Gate Arrays (FPGAs) may be included in the one or more processors 102 and 202. For example, the one or more processors 102 and 202 may be configured by a set of a communication control processor, an Application Processor (AP), an Electronic Control Unit (ECU), a Central Processing Unit (CPU), a Graphic Processing Unit (GPU), and a memory control processor.

The one or more memories 104 and 204 may be connected to the one or more processors 102 and 202 and store various types of data, signals, messages, information, programs, code, instructions, and/or commands. The one or more memories 104 and 204 may be configured by Random Access Memory (RAM), Dynamic RAM (DRAM), Read-Only Memory (ROM), electrically Erasable Programmable Read-Only Memory (EPROM), flash memory, volatile memory, non-volatile memory, hard drive, register, cash memory, computer-readable storage medium, and/or combinations thereof. The one or more memories 104 and 204 may be located at the interior and/or exterior of the one or more processors 102 and 202. The one or more memories 104 and 204 may be connected to the one or more processors 102 and 202 through various technologies such as wired or wireless connection.

The one or more transceivers 106 and 206 may transmit user data, control information, and/or radio signals/channels, mentioned in the descriptions, functions, procedures, suggestions, methods and/or operational flowcharts disclosed in the present disclosure, to one or more other devices. The one or more transceivers 106 and 206 may receive user data, control information, and/or radio signals/channels, mentioned in the descriptions, functions, procedures, suggestions, methods and/or operational flowcharts disclosed in the present disclosure, from one or more other devices. For example, the one or more transceivers 106 and 206 may be connected to the one or more processors 102 and 202 and transmit and receive radio signals. For example, the one or more processors 102 and 202 may perform control so that the one or more transceivers 106 and 206 may transmit user data, control information, or radio signals to one or more other devices. The one or more processors 102 and 202 may perform control so that the one or more transceivers 106 and 206 may receive user data, control information, or radio signals from one or more other devices.

The one or more transceivers 106 and 206 may be connected to the one or more antennas 108 and 208. Additionally and/or alternatively, the one or more transceivers 106 and 206 may include one or more antennas 108 and 208. The one or more transceivers 106 and 206 may be adapted to transmit and receive user data, control information, and/or radio signals/channels, mentioned in the descriptions, functions, procedures, suggestions, methods and/or operational flowcharts disclosed in the present disclosure, through the one or more antennas 108 and 208. In the present disclosure, the one or more antennas 108 and 208 may be a plurality of physical antennas or a plurality of logical antennas (e.g., antenna ports).

The one or more transceivers 106 and 206 may convert received user data, control information, radio signals/channels, etc., from RF band signals into baseband signals in order to process received user data, control information, radio signals/channels, etc., using the one or more processors 102 and 202. The one or more transceivers 106 and 206 may convert the user data, control information, radio signals/channels, etc., processed using the one or more processors 102 and 202 from the base band signals into the RF band signals. To this end, the one or more transceivers 106 and 206 may include (analog) oscillators and/or filters. For example, the one or more transceivers 106 and 206 can up-convert OFDM baseband signals to OFDM signals by their (analog) oscillators and/or filters under the control of the one or more processors 102 and 202 and transmit the up-converted OFDM signals at the carrier frequency. The one or more transceivers 106 and 206 may receive OFDM signals at a carrier frequency and down-convert the OFDM signals into OFDM baseband signals by their (analog) oscillators and/or filters under the control of the one or more processors 102 and 202.

Although not shown in FIG. 2, the wireless devices 100 and 200 may further include additional components. The additional components 140 may be variously configured according to types of the wireless devices 100 and 200. For example, the additional components 140 may include at least one of a power unit/battery, an Input/Output (I/O) device (e.g., audio I/O port, video I/O port), a driving device, and a computing device. The additional components 140 may be coupled to the one or more processors 102 and 202 via various technologies, such as a wired or wireless connection.

In the implementations of the present disclosure, a UE may operate as a transmitting device in Uplink (UL) and as a receiving device in Downlink (DL). In the implementations of the present disclosure, a BS may operate as a receiving device in UL and as a transmitting device in DL. Hereinafter, for convenience of description, it is mainly assumed that the first wireless device 100 acts as the UE, and the second wireless device 200 acts as the BS. For example, the processor(s) 102 connected to, mounted on or launched in the first wireless device 100 may be adapted to perform the UE behavior according to an implementation of the present disclosure or control the transceiver(s) 106 to perform the UE behavior according to an implementation of the present disclosure. The processor(s) 202 connected to, mounted on or launched in the second wireless device 200 may be adapted to perform the BS behavior according to an implementation of the present disclosure or control the transceiver(s) 206 to perform the BS behavior according to an implementation of the present disclosure.

In the present disclosure, a BS is also referred to as a node B (NB), an eNode B (eNB), or a gNB.

Figure 3:
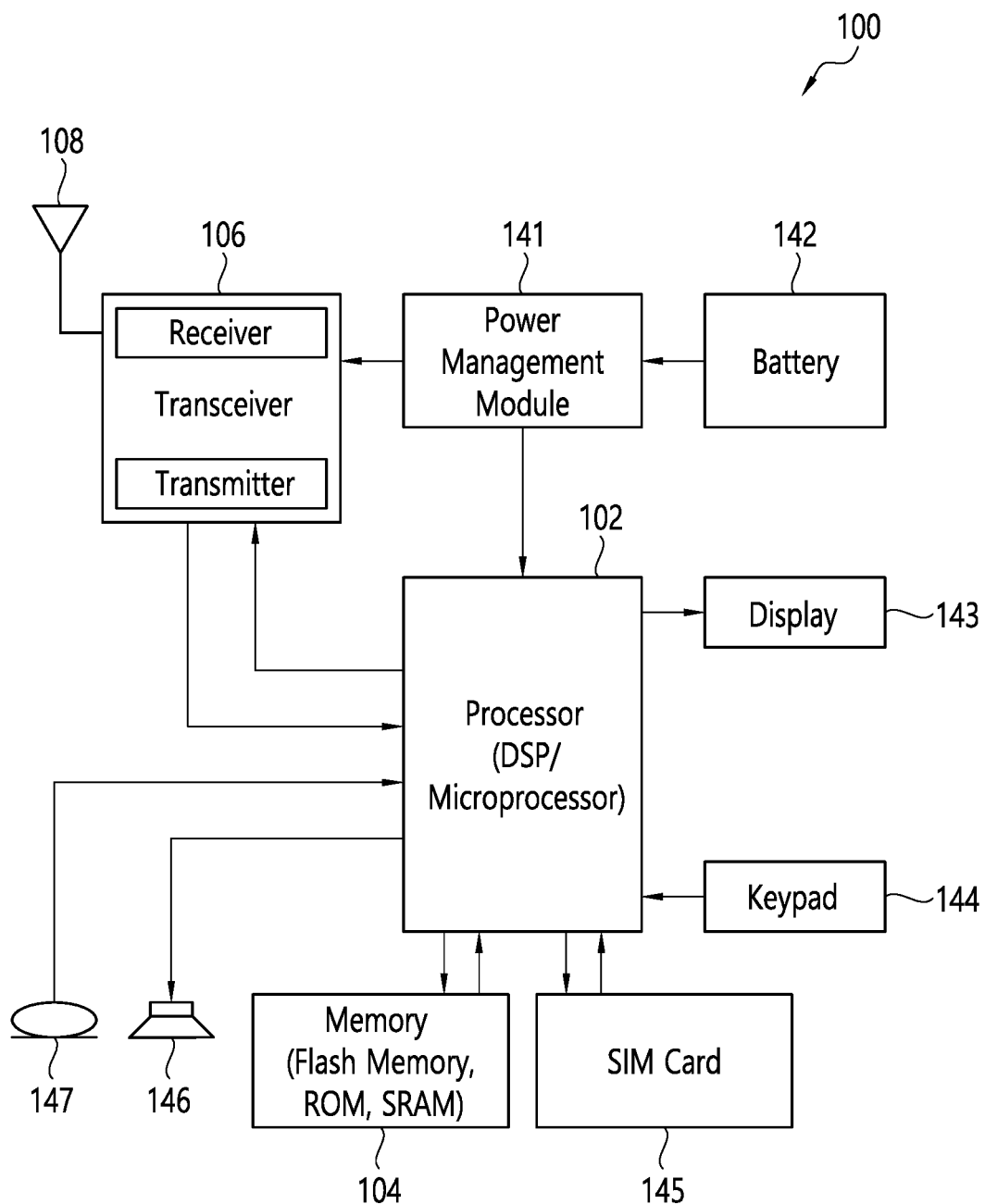
FIG. 3 shows an example of UE to which implementations of the present disclosure is applied.

FIG. 3 Shows an Example of UE to which Implementations of the Present Disclosure is Applied.

Referring to FIG. 3, a UE 100 may correspond to the first wireless device 100 of FIG. 2.

A UE 100 includes a processor 102, a memory 104, a transceiver 106, one or more antennas 108, a power management module 141, a battery 142, a display 143, a keypad 144, a Subscriber Identification Module (SIM) card 145, a speaker 146, and a microphone 147.

The processor 102 may be adapted to implement the descriptions, functions, procedures, suggestions, methods and/or operational flowcharts disclosed in the present disclosure. The processor 102 may be adapted to control one or more other components of the UE 100 to implement the descriptions, functions, procedures, suggestions, methods and/or operational flowcharts disclosed in the present disclosure. Layers of the radio interface protocol may be implemented in the processor 102. The processor 102 may include ASIC, other chipset, logic circuit and/or data processing device. The processor 102 may be an application processor. The processor 102 may include at least one of DSP, CPU, GPU, a modem (modulator and demodulator). An example of the processor 102 may be found in SNAPDRAGON™ series of processors made by Qualcomm®, EXYNOS™ series of processors made by Samsung®, A series of processors made by Apple®, HELIO™ series of processors made by MediaTek®, ATOM™ series of processors made by Intel® or a corresponding next generation processor.

The memory 104 is operatively coupled with the processor 102 and stores a variety of information to operate the processor 102. The memory 104 may include ROM, RAM, flash memory, memory card, storage medium and/or other storage device. When the embodiments are implemented in software, the techniques described herein can be implemented with modules (e.g., procedures, functions, etc.) that perform the descriptions, functions, procedures, suggestions, methods and/or operational flowcharts disclosed in the present disclosure. The modules can be stored in the memory 104 and executed by the processor 102. The memory 104 can be implemented within the processor 102 or external to the processor 102 in which case those can be communicatively coupled to the processor 102 via various means as is known in the art.

The transceiver 106 is operatively coupled with the processor 102, and transmits and/or receives a radio signal. The transceiver 106 includes a transmitter and a receiver. The transceiver 106 may include baseband circuitry to process radio frequency signals. The transceiver 106 controls the one or more antennas 108 to transmit and/or receive a radio signal.

The power management module 141 manages power for the processor 102 and/or the transceiver 106. The battery 142 supplies power to the power management module 141.

The display 143 outputs results processed by the processor 102. The keypad 144 receives inputs to be used by the processor 102. The keypad 144 may be shown on the display 143.

The SIM card 145 is an integrated circuit that is intended to securely store the International Mobile Subscriber Identity (IMSI) number and its related key, which are used to identify and authenticate subscribers on mobile telephony devices (such as mobile phones and computers). It is also possible to store contact information on many SIM cards.

The speaker 146 outputs sound-related results processed by the processor 102. The microphone 147 receives sound-related inputs to be used by the processor 102.

<6G System General>

A 6G (wireless communication) system has purposes such as (i) very high data rate per device, (ii) a very large number of connected devices, (iii) global connectivity, (iv) very low latency, (v) decrease in energy consumption of battery-free IoT devices, (vi) ultra-reliable connectivity, and (vii) connected intelligence with machine learning capacity. The vision of the 6G system may include four aspects such as "intelligent connectivity", "deep connectivity", "holographic connectivity" and "ubiquitous connectivity", and the 6G system may satisfy the requirements shown in Table 4 below. That is, Table 4 shows the requirements of the 6G system.

TABLE 3

| Per device peak data rate | 1 Tbps |
|---|---|
| E2E latency | 1 ms |
| Maximum spectral efficiency | 100 bps/Hz |
| Mobility support | Up to 1000 km/hr |
| Satellite integration | Fully |
| AI | Fully |
| Autonomous vehicle | Fully |
| XR | Fully |
| Haptic Communication | Fully |

The 6G system may have key factors such as enhanced mobile broadband (eMBB), ultra-reliable low latency communications (URLLC), massive machine type communications (mMTC), AI integrated communication, tactile Internet, high throughput, high network capacity, high energy efficiency, low backhaul and access network congestion and enhanced data security.

Figure 4:
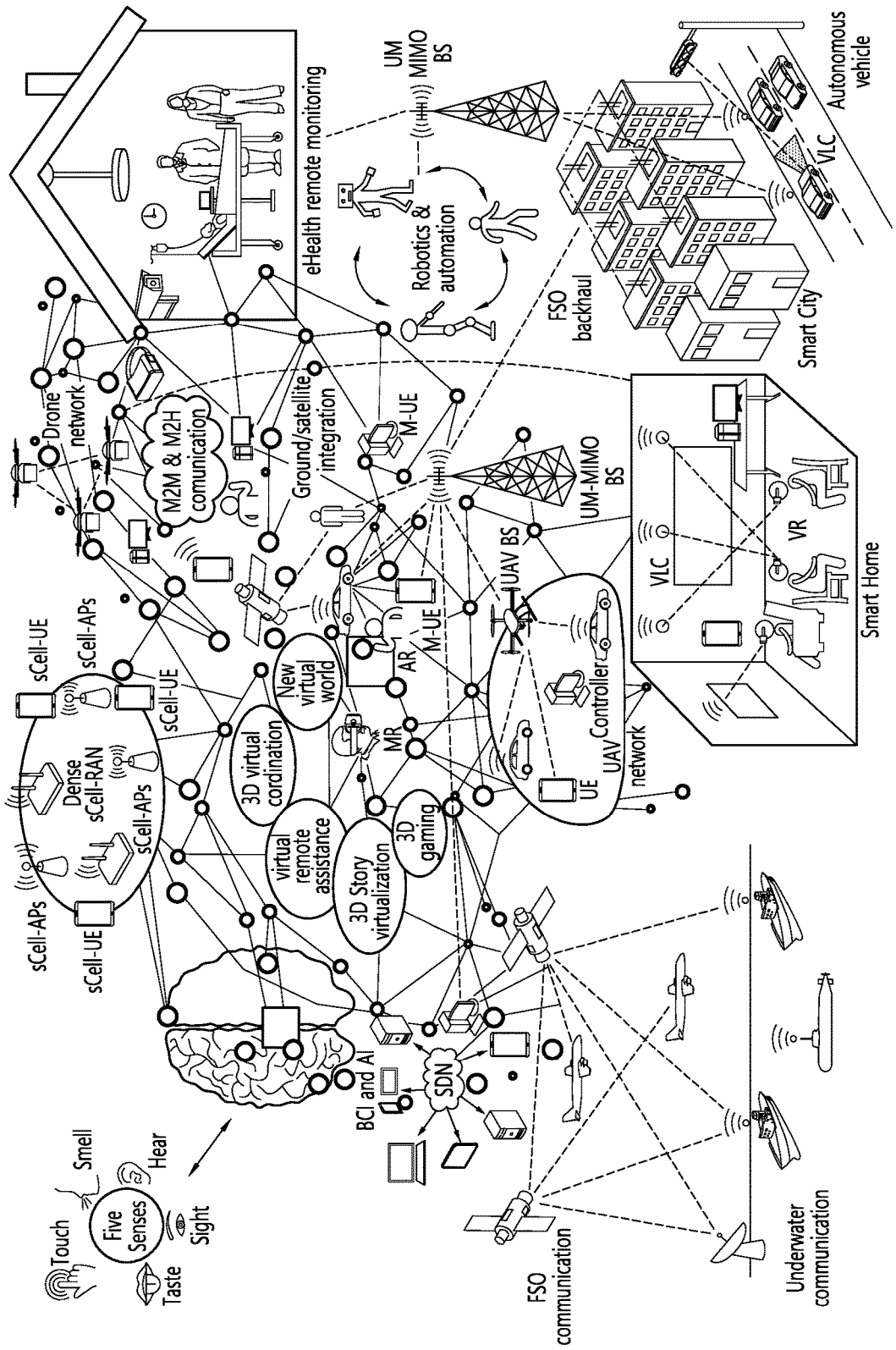
FIG. 4 is a diagram showing an example of a communication structure that can be provided in a 6G system.

FIG. 4 is a Diagram Showing an Example of a Communication Structure that can be Provided in a 6G System.

The 6G system will have 50 times higher simultaneous wireless communication connectivity than a 5G wireless communication system. URLLC, which is the key feature of 5G, will become more important technology by providing end-to-end latency less than 1 ms in 6G communication. At this time, the 6G system may have much better volumetric spectrum efficiency unlike frequently used domain spectrum efficiency. The 6G system may provide advanced battery technology for energy harvesting and very long battery life and thus mobile devices may not need to be separately charged in the 6G system. In addition, in 6G, new network characteristics may be as follows.

Satellites integrated network: To provide a global mobile group, 6G will be integrated with satellite. Integrating terrestrial waves, satellites and public networks as one wireless communication system may be very important for 6G.

Connected intelligence: Unlike the wireless communication systems of previous generations, 6G is innovative and wireless evolution may be updated from "connected things" to "connected intelligence". AI may be applied in each step (or each signal processing procedure which will be described below) of a communication procedure.

Seamless integration of wireless information and energy transfer: A 6G wireless network may transfer power in order to charge the batteries of devices such as smartphones and sensors. Therefore, wireless information and energy transfer (WIET) will be integrated.

Ubiquitous super 3-dimemtion connectivity: Access to networks and core network functions of drones and very low earth orbit satellites will establish super 3D connection in 6G ubiquitous.

In the new network characteristics of 6G, several general requirements may be as follows.

Small cell networks: The idea of a small cell network was introduced in order to improve received signal quality as a result of throughput, energy efficiency and spectrum efficiency improvement in a cellular system. As a result, the small cell network is an essential feature for 5G and beyond 5G (5 GB) communication systems. Accordingly, the 6G communication system also employs the characteristics of the small cell network.

Ultra-dense heterogeneous network: Ultra-dense heterogeneous networks will be another important characteristic of the 6G communication system. A multi-tier network composed of heterogeneous networks improves overall QoS and reduce costs.

High-capacity backhaul: Backhaul connection is characterized by a high-capacity backhaul network in order to support high-capacity traffic. A high-speed optical fiber and free space optical (FSO) system may be a possible solution for this problem.

Radar technology integrated with mobile technology: High-precision localization (or location-based service) through communication is one of the functions of the 6G wireless communication system. Accordingly, the radar system will be integrated with the 6G network.

Softwarization and virtualization: Softwarization and virtualization are two important functions which are the bases of a design process in a 5 GB network in order to ensure flexibility, reconfigurability and programmability.

<Core Implementation Technology of 6G System>
Artificial Intelligence

Technology which is most important in the 6G system and will be newly introduced is AI. AI was not involved in the 4G system. A 5G system will support partial or very limited AI. However, the 6G system will support AI for full automation. Advance in machine learning will create a more intelligent network for real-time communication in 6G. When AI is introduced to communication, real-time data transmission may be simplified and improved. AI may determine a method of performing complicated target tasks using countless analysis. That is, AI may increase efficiency and reduce processing delay.

Time-consuming tasks such as handover, network selection or resource scheduling may be immediately performed by using AI. AI may play an important role even in M2M, machine-to-human and human-to-machine communication. In addition, AI may be rapid communication in a brain computer interface (BCI). An AI based communication system may be supported by meta materials, intelligent structures, intelligent networks, intelligent devices, intelligent recognition radios, self-maintaining wireless networks and machine learning.

Recently, attempts have been made to integrate AI with a wireless communication system in the application layer or the network layer, but deep learning have been focused on the wireless resource management and allocation field. However, such studies are gradually developed to the MAC layer and the physical layer, and, particularly, attempts to combine deep learning in the physical layer with wireless transmission are emerging. AI-based physical layer transmission means applying a signal processing and communication mechanism based on an AI driver rather than a traditional communication framework in a fundamental signal processing and communication mechanism. For example, channel coding and decoding based on deep learning, signal estimation and detection based on deep learning, multiple input multiple output (MIMO) mechanisms based on deep learning, resource scheduling and allocation based on AI, etc. may be included.

Machine learning may be used for channel estimation and channel tracking and may be used for power allocation, interference cancellation, etc. in the physical layer of DL. In addition, machine learning may be used for antenna selection, power control, symbol detection, etc. in the MIMO system.

Machine learning refers to a series of operations to train a machine in order to create a machine which can perform tasks which cannot be performed or are difficult to be performed by people. Machine learning requires data and learning models. In machine learning, data learning methods may be roughly divided into three methods, that is, supervised learning, unsupervised learning and reinforcement learning.

Neural network learning is to minimize output error. Neural network learning refers to a process of repeatedly inputting training data to a neural network, calculating the error of the output and target of the neural network for the training data, backpropagating the error of the neural network from the output layer of the neural network to an input layer in order to reduce the error and updating the weight of each node of the neural network.

Supervised learning may use training data labeled with a correct answer and the unsupervised learning may use training data which is not labeled with a correct answer. That is, for example, in case of supervised learning for data classification, training data may be labeled with a category. The labeled training data may be input to the neural network, and the output (category) of the neural network may be compared with the label of the training data, thereby calculating the error. The calculated error is backpropagated from the neural network backward (that is, from the output layer to the input layer), and the connection weight of each node of each layer of the neural network may be updated according to backpropagation. Change in updated connection weight of each node may be determined according to the learning rate. Calculation of the neural network for input data and backpropagation of the error may configure a learning cycle (epoch). The learning data is differently applicable according to the number of repetitions of the learning cycle of the neural network. For example, in the early phase of learning of the neural network, a high learning rate may be used to increase efficiency such that the neural network rapidly ensures a certain level of performance and, in the late phase of learning, a low learning rate may be used to increase accuracy.

The learning method may vary according to the feature of data. For example, for the purpose of accurately predicting data transmitted from a transmitter in a receiver in a communication system, learning may be performed using supervised learning rather than unsupervised learning or reinforcement learning.

The learning model corresponds to the human brain and may be regarded as the most basic linear model. However, a paradigm of machine learning using a neural network structure having high complexity, such as artificial neural networks, as a learning model is referred to as deep learning.

Neural network cores used as a learning method may roughly include a deep neural network (DNN) method, a convolutional deep neural network (CNN) method, a recurrent Boltzmman machine (RNN) method and a spiking neural networks (SNN). Such a learning model is applicable.

THz (Terahertz) Communication

Figure 5:
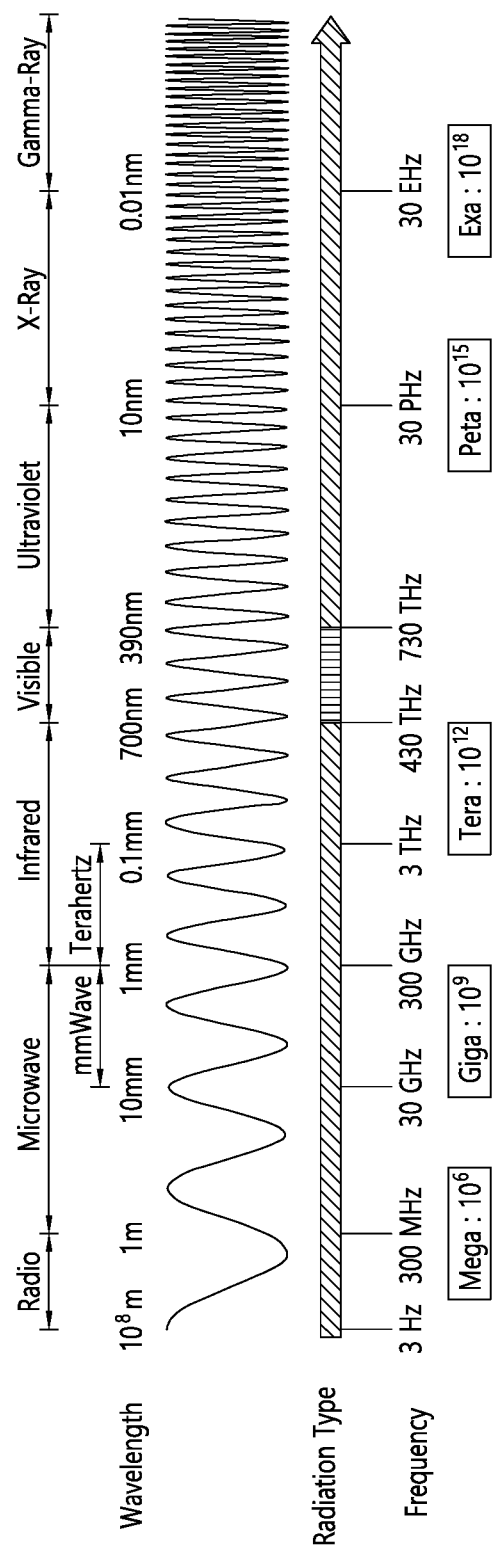
FIG. 5 shows an example of an electromagnetic spectrum.

A data rate may increase by increasing bandwidth. This may be performed by using sub-TH communication with wide bandwidth and applying advanced massive MIMO technology. THz waves which are known as sub-millimeter radiation, generally indicates a frequency band between 0.1 THz and 10 THz with a corresponding wavelength in a range of 0.03 mm to 3 mm. A band range of 100 GHz to 300 GHz (sub THz band) is regarded as a main part of the THz band for cellular communication. When the sub-THz band is added to the mmWave band, the 6G cellular communication capacity increases. 300 GHz to 3 THz of the defined THz band is in a far infrared (IR) frequency band. A band of 300 GHz to 3 THz is a part of an optical band but is at the border of the optical band and is just behind an RF band. Accordingly, the band of 300 GHz to 3 THz has similarity with RF. FIG. 5 Shows an Example of an Electromagnetic Spectrum.

The main characteristics of THz communication include (i) bandwidth widely available to support a very high data rate and (ii) high path loss occurring at a high frequency (a high directional antenna is indispensable). A narrow beam width generated in the high directional antenna reduces interference. The small wavelength of a THz signal allows a larger number of antenna elements to be integrated with a device and BS operating in this band. Therefore, an advanced adaptive arrangement technology capable of overcoming a range limitation may be used.

Large-Scale MIMO

One of core technologies for improving spectrum efficiency is MIMO technology. When MIMO technology is improved, spectrum efficiency is also improved. Accordingly, massive MIMO technology will be important in the 6G system. Since MIMO technology uses multiple paths, multiplexing technology and beam generation and management technology suitable for the THz band should be significantly considered such that data signals are transmitted through one or more paths.

Hologram Beamforming

Beamforming is a signal processing procedure that adjusts an antenna array to transmit radio signals in a specific direction. This is a subset of smart antennas or advanced antenna systems. Beamforming technology has several advantages, such as high signal-to-noise ratio, interference prevention and rejection, and high network efficiency. Hologram Beamforming (HBF) is a new beamforming method that differs significantly from MIMO systems because this uses a software-defined antenna. HBF will be a very effective approach for efficient and flexible transmission and reception of signals in multi-antenna communication devices in 6G.

Optical Wireless Technology

Optical wireless communication (OWC) is a form of optical communication that uses visible light, infrared light (IR), or ultraviolet light (UV) to carry signals. OWC operating in the visible light band (e.g., 390 to 750 nm) is commonly referred to as visible light communication (VLC). VLC implementations may utilize light-emitting diodes (LEDs). VLC may be used in a variety of applications, including wireless local area networks, wireless personal communications networks, and vehicular networks.

VLC has the following advantages over RF-based technologies. First, the spectrum occupied by VLC is free/unlicensed and may provide extensive bandwidth (THz-level bandwidth). Second, VLC rarely causes significant interference to other electromagnetic devices. Therefore, VLC may be applied in sensitive electromagnetic interference applications such as aircraft and hospitals. Third, VLC has strengths in communication security and privacy. The transmission medium of VLC-based networks, namely visible light, cannot pass through walls and other opaque obstacles. Therefore, the transmission range of VLC may be limited to indoors, which may protect users' privacy and sensitive information. Fourth, VLC can use an illuminated light source as a base station, eliminating the need for expensive base stations.

Free-space optical communication (FSO) is an optical communication technology that uses light propagating in free space, such as air, outer space, and vacuum, to wirelessly transmit data for telecommunications or computer networking. FSO can be used as a point-to-point OWC system on the ground. FSO can operate in the near-infrared frequency (750-1600 nm). Laser transmitters can be used in FSO implementations, and FSO can provide high data rates (e.g., 10 Gbit/s), offering a potential solution to backhaul bottlenecks.

These OWC technologies are planned for 6G communications in addition to RF-based communications for all possible device-to-access networks. These networks will access network-to-backhaul/fronthaul network connections. OWC technology has already been in use since 4G communication systems, but will be more widely used to meet the needs of 6G communication systems. OWC technologies such as light fidelity, visible light communication, optical camera communication, and FSO communication based on optical bands are already well-known technologies. Communication based on optical wireless technology can provide very high data rates, low latency, and secure communication.

Light detection and ranging (LiDAR) may also be utilized for ultra-high resolution 3D mapping in 6G communications based on the optical band. LiDAR is a remote sensing method that uses near-infrared, visible, and ultraviolet light to illuminate an object, and the reflected light is detected by a light sensor to measure distance. LiDAR may be used for fully automated driving of cars.

FSO Backhaul Network

The characteristics of the transmitter and receiver of the FSO system are similar to those of an optical fiber network. Accordingly, data transmission of the FSO system similar to that of the optical fiber system. Accordingly, FSO may be a good technology for providing backhaul connection in the 6G system along with the optical fiber network. When FSO is used, very long-distance communication is possible even at a distance of 10,000 km or more. FSO supports mass backhaul connections for remote and non-remote areas such as sea, space, underwater and isolated islands. FSO also supports cellular base station connections.

Non-Terrestrial Networks (NTN)

6G systems will integrate terrestrial and aerial networks to support vertically scaled user communications. 3D BS will be delivered via low-orbit satellites and UAVs. Adding a new dimension in terms of altitude and associated degrees of freedom makes 3D connectivity quite different from traditional 2D networks. NR considers Non-Terrestrial Networks (NTN) as one way to do this. An NTN is a network or network segment that utilizes RF resources aboard a satellite (or UAS platform).

There are two common scenarios for NTNs that provide access to user equipment: transparent payloads and regenerative payloads. The following are the basic elements of an NTN

- One or several sat-gateways connecting the NTN to the public data network.
- GEO satellites are fed by one or multiple sat-gateways deployed across the satellite target range (e.g., regional or continental coverage). We assume that a UE in a cell is served by only one sat-gateway.
- Non-GEO satellites that are served by one or several satellite gateways in succession at a time. The system ensures service and feeder link continuity between successively serviced satellite gateways with a time duration sufficient to allow mobility anchoring and handover.
- The feeder link or radio link between the satellite gateway and the satellite (or UAS platform).
- Service link or radio link between the user equipment and the satellite (or UAS platform).
- Satellite (or UAS platform) capable of implementing transparent or regenerative (including onboard processing) payloads. Satellite (or UAS platform) generated beam A satellite (or UAS platform) generates multiple beams for a given service area, typically based on its field of view. The footprint of the beam is typically elliptical. The field of view of the satellite (or UAS platform) depends on the onboard antenna diagram and the minimum angle of attack.
- Transparent payload: Radio frequency filtering, frequency conversion, and amplification. Therefore, the waveform signal repeated by the payload remains unchanged.
- Regenerative payload: Radio frequency filtering, frequency conversion and amplification, demodulation/decryption, switching and/or routing, and coding/modulation. This is effectively the same as having all or part of the base station functions (e.g., gNB) on board a satellite (or UAS platform).
- Optionally, in the case of satellite deployment, an inter-satellite link (ISL). This requires a regenerative payload on the satellite. ISLs can operate in RF frequencies or optical bands.
- The user equipment is serviced by the satellite (or UAS platform) within the targeted coverage area.

Typically, GEO satellites and UAS are used to provide continental, regional, or local services.

Typically, constellations in LEO and MEO are used to provide service in both the Northern and Southern Hemispheres. In some cases, constellations may also provide global coverage, including polar regions. The latter requires proper orbital inclination, sufficient beams generated, and links between satellites.

Quantum Communication

Quantum communication is a next-generation communication technology that can overcome the limitations of conventional communication, such as security and ultra-fast computation, by applying quantum mechanical properties to the field of communication. Quantum communication provides a means of generating, transmitting, processing, and storing information that cannot be expressed in the form of 0 and 1 according to binary bit information used in existing communication technologies. In conventional communication technologies, wavelengths or amplitudes are used to transmit information between the transmitting and receiving ends, but in quantum communication, photons, the smallest unit of light, are used to transmit information between the transmitting and receiving ends. In particular, in the case of quantum communication, quantum uncertainty and quantum irreversibility can be used for the polarization or phase difference of photons (light), so quantum communication has the characteristic of being able to communicate with perfect security. Quantum communication may also enable ultra-high-speed communication using quantum entanglement under certain conditions.

Cell-Free Communication

The tight integration of multiple frequencies and heterogeneous communication technologies will be crucial in 6G systems. As a result, users will be able to seamlessly move from one network to another without having to create any manual configurations on their devices. The best network is automatically selected from the available communication technologies. This will break the limitations of the cell concept in wireless communication. Currently, user movement from one cell to another causes too many handovers in dense networks, resulting in handover failures, handover delays, data loss, and ping-pong effects. 6G cell-free communication will overcome all this and provide better QoS.

Cell-free communication is defined as "a system in which a large number of geographically distributed antennas (APs) cooperatively serve a small number of terminals using the same time/frequency resources with the help of a fronthaul network and a CPU". A single terminal is served by a set of multiple APs, called an AP cluster. There are several ways to form AP clusters, among which the method of configuring AP clusters with APs that can significantly contribute to improving the reception performance of the terminal is called the terminal-centered clustering method, and when using this method, the configuration is dynamically updated as the terminal moves. By adopting this device-centric AP clustering technique, the device is always at the center of the AP cluster and is therefore free from inter-cluster interference that can occur when the device is located at the boundary of the AP cluster. This cell-free communication will be achieved through multi-connectivity and multi-tier hybrid technologies and different heterogeneous radios in the device.

Integration of Wireless Information and Energy Transfer (WIET)

WIET uses the same field and wave as a wireless communication system. In particular, a sensor and a smartphone will be charged using wireless power transfer during communication. WIET is a promising technology for extending the life of battery charging wireless systems. Therefore, devices without batteries will be supported in 6G communication.

Integration of Wireless Communication and Sensing

An autonomous wireless network is a function for continuously detecting a dynamically changing environment state and exchanging information between different nodes. In 6G, sensing will be tightly integrated with communication to support autonomous systems.

Integrated Access and Backhaul Network

In 6G, the density of access networks will be enormous. Each access network is connected by optical fiber and backhaul connection such as FSO network. To cope with a very large number of access networks, there will be a tight integration between the access and backhaul networks.

Big Data Analysis

Big data analysis is a complex process for analyzing various large data sets or big data. This process finds information such as hidden data, unknown correlations, and customer disposition to ensure complete data management. Big data is collected from various sources such as video, social networks, images and sensors. This technology is widely used for processing massive data in the 6G system.

Reconfigurable Intelligent Surfaces

A large body of research has focused on the radio environment as a variable to be optimized along with the transmitter and receiver. The radio environments created by this approach are referred to as Smart Radio Environments (SREs) or Intelligent Radio Environments (IREs) to highlight their fundamental differences from past design and optimization criteria. Various terms have been proposed for reconfigurable intelligent antenna (or intelligent reconfigurable antenna technology) as an SRE enabling technology, including Reconfigurable Metasurfaces, Smart Large Intelligent Surfaces (SLIS), Large Intelligent Surfaces (LIS), Reconfigurable Intelligent Surface (RIS), and Intelligent Reflecting Surface (IRS).

In the case of THz band signals, there are many shadowed areas caused by obstacles due to the strong straightness of the signal, and it is important to install RIS near these shadowed areas to expand the communication area, strengthen communication stability, and enable additional optional services. RIS is an artificial surface made of electromagnetic materials that can alter the propagation of incoming and outgoing radio waves. While RIS can be seen as an extension of massive MIMO, it has a different array structure and operating mechanism than massive MIMO. RIS also has the advantage of lower power consumption because it operates as a reconfigurable reflector with passive elements, meaning it only passively reflects the signal without using an active RF chain. In addition, each of the passive reflectors in the RIS must independently adjust the phase shift of the incident signal, which can be advantageous for wireless communication channels. By properly adjusting the phase shift through the RIS controller, the reflected signal can be gathered at the target receiver to boost the received signal power.

In addition to reflecting radio signals, some RISs are capable of tuning transmission and refractive properties, and these are often used for outdoor to indoor (O2I) applications. Recently, STAR-RIS (Simultaneous Transmission and Reflection RIS), which provides transmission while reflecting, has also been actively researched.

Metaverse

Metaverse is a combination of the words "meta" meaning virtual, transcendent, and "universe" meaning space. In general, the term is used to describe a three-dimensional virtual space in which the same social and economic activities as in the real world are commonplace.

Extended Reality (XR), a key technology that enables the metaverse, can extend the experience of reality and provide a unique immersive experience through the convergence of virtual and real world. The high bandwidth and low latency of 6G networks will enable users to experience more immersive virtual reality (VR) and augmented reality (AR) experiences.

Autonomous Driving (Self-Driving)

For complete autonomous driving, vehicles must communicate with each other to inform each other of dangerous situations, or with infrastructure such as parking lots and traffic lights to check information such as the location of parking information and signal change times. Vehicle-to-Everything (V2X), a key element in building an autonomous driving infrastructure, is a technology that enables vehicles to communicate and share information with various elements on the road, such as vehicle-to-vehicle (V2V) and vehicle-to-infrastructure (V2I), to perform autonomous driving.

In order to maximize the performance of autonomous driving and ensure high safety, fast transmission speeds and low latency technologies are essential. In addition, in the future, autonomous driving will require a large amount of information to be transmitted and received in order to actively intervene in the operation of the vehicle and directly control the vehicle in dangerous situations, beyond delivering warnings or guidance messages to the driver, and 6G is expected to maximize autonomous driving with faster transmission speeds and lower latency than 5G.

Unmanned Aerial Vehicle (UAV)

An unmanned aerial vehicle (UAV) or drone will be an important factor in 6G wireless communication. In most cases, a high-speed data wireless connection is provided using UAV technology. A base station entity is installed in the UAV to provide cellular connectivity. UAVs have certain features, which are not found in fixed base station infrastructures, such as easy deployment, strong line-of-sight links, and mobility-controlled degrees of freedom. During emergencies such as natural disasters, the deployment of terrestrial telecommunications infrastructure is not economically feasible and sometimes services cannot be provided in volatile environments. The UAV can easily handle this situation. The UAV will be a new paradigm in the field of wireless communications. This technology facilitates the three basic requirements of wireless networks, such as eMBB, URLLC and mMTC. The UAV can also serve a number of purposes, such as network connectivity improvement, fire detection, disaster emergency services, security and surveillance, pollution monitoring, parking monitoring, and accident monitoring. Therefore, UAV technology is recognized as one of the most important technologies for 6G communication.

Block-Chain

A blockchain will be important technology for managing large amounts of data in future communication systems. The blockchain is a form of distributed ledger technology, and distributed ledger is a database distributed across numerous nodes or computing devices. Each node duplicates and stores the same copy of the ledger. The blockchain is managed through a peer-to-peer (P2P) network. This may exist without being managed by a centralized institution or server. Blockchain data is collected together and organized into blocks. The blocks are connected to each other and protected using encryption. The blockchain completely complements large-scale IoT through improved interoperability, security, privacy, stability and scalability. Accordingly, the blockchain technology provides several functions such as interoperability between devices, high-capacity data traceability, autonomous interaction of different IoT systems, and large-scale connection stability of 6G communication systems.

Figure 6:
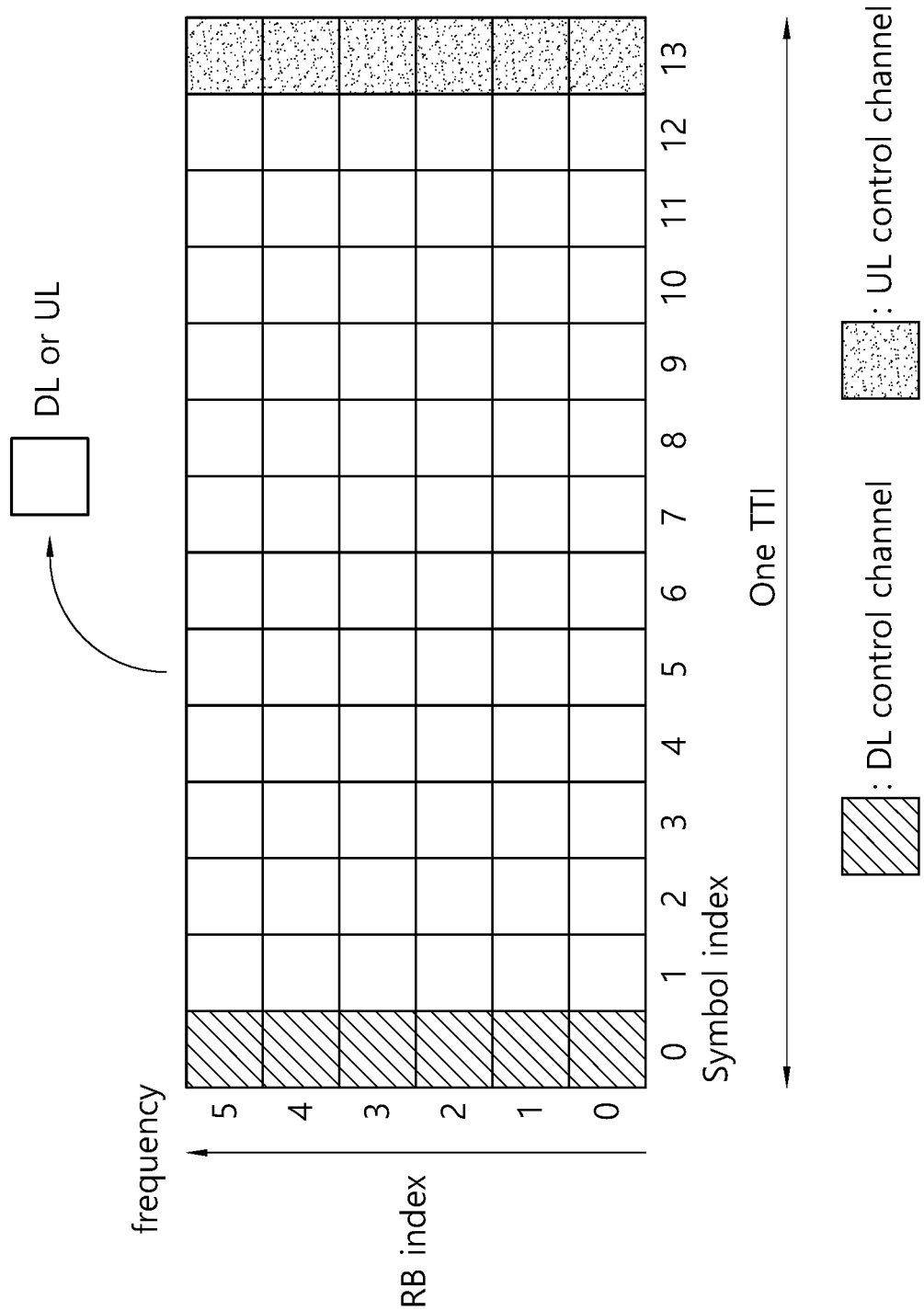
FIG. 6 shows an example of subframe types in NR.

FIG. 6 Shows an Example of Subframe Types in NR.

Figure 8:
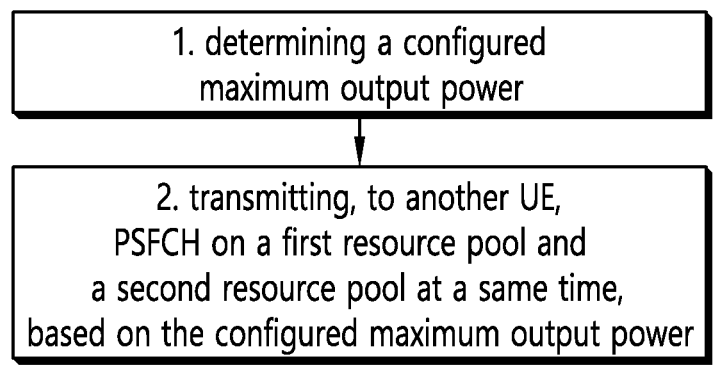
FIG. 8 shows a procedure of a UE according to the disclosure of the present specification.

The TTI (transmission time interval) shown in FIG. 6 may be referred to as a subframe or a slot for NR (or new RAT). The subframe (or slot) of FIG. 8 may be used in a TDD system of NR (or new RAT) to minimize data transmission delay. As shown in FIG. 8, a subframe (or slot) includes 14 symbols, like the current subframe. The front symbol of the subframe (or slot) may be used for the DL control channel, and the rear symbol of the subframe (or slot) may be used for the UL control channel. The remaining symbols may be used for DL data transmission or UL data transmission. According to this subframe (or slot) structure, downlink transmission and uplink transmission may be sequentially performed in one subframe (or slot). Accordingly, downlink data may be received within a subframe (or slot), and uplink acknowledgment (ACK/NACK) may be transmitted within the subframe (or slot).

This structure of subframes (or slots) can be referred to as self-contained subframes (or slots). The advantage of using this structure of subframes (or slots) is that it reduces the time it takes to retransmit data that has been received in error, minimizing the latency of the final data transmission. In such a self-contained subframe (or slot) structure, a time gap may be required for the transition from transmit mode to receive mode or from receive mode to transmit mode. For this purpose, some OFDM symbols in the transition from DL to UL in the subframe structure may be set to Guard Period (GP).

<Sidelink>

1. Sidelink

The sidelink direct communication/navigation/synchronization resource configuration applies to the received/acquired frequency. Furthermore, for UEs composed of one or more SCells, the sidelink direct communication/navigation/synchronization resource configuration provided by dedicated signaling applies to the corresponding PCell/main frequency. Furthermore, the UE shall not use sidelink direct communication/navigation/synchronization transmission resources received from one cell with timing from another cell.

The upper layers may configure the UE to receive or transmit sidelink direct communications on specific frequencies, monitor sidelink direct discovery notifications on one or more frequencies, or transmit sidelink direct discovery notifications on specific frequencies, but only if the UE is authorized to perform these specific ProSe related sidelink activities.

If the desired sidelink activity cannot be performed (e.g., due to UE capability limitations), it is up to the UE implementation to determine what action to take (e.g., terminate unicast service, disconnect).

FIG. 7 Illustrates an Example of a Method for Limiting the Transmit Power of a Terminal.

As shown in (a) of FIG. 7, the terminal 100 performs transmission by reducing its transmission power.

When the peak-to-average power ratio (PAPR) increases, the linearity of the power amplifier (PA) may be reduced by a maximum power reduction (MPR) value to reduce the transmit power.

As shown in (b) of FIG. 7, the base station (BS) may apply an additional maximum power reduction (A-MPR) by transmitting a network signal (NS) to the terminal 100. Unlike MPR, A-MPR is an operation in which the BS transmits NS to the terminal 100 operating in a specific operating band so that the terminal performs additional power reduction in order to avoid affecting neighboring bands, etc. In other words, when the terminal 100 with MPR receives NS, A-MPR is additionally applied to determine the transmission power.

2. Configured Transmission Power

The NR V2X UE may set the configured maximum output power $P_{CMAX,f,c}$ for the carrier f of the serving cell c in each slot. The configured maximum output power $P_{CMAX,f,c}$ is set within the following range:

$P_{CMAX\_L,f,c} \leq P_{CMAX,f,c} \leq P_{CMAX\_H,f,c}$ with
$P_{CMAX\_L,f,c} = \text{MIN} \{P_{EMAX,c}, P_{PowerClass,V2X} - \text{MAX}(\text{MAX}(MPR_c, A-MPR_c) + \Delta T_{IB,c}, P-MPR_c), P_{Regulatory,c}\}$
$P_{CMAX\_H,f,c} = \text{MIN} \{P_{EMAX,c}, P_{PowerClass}, P_{Regulatory}\}$
$P_{CMAX,f,c}$ are configured for PSSCH, PSCCH, S-SSB, and PSFCH, respectively;

Configured maximum transmit power $P_{CMAX,PSSCH/PSCCH}$ for PSSCH and PSCCH, $P_{EMAX,c}$ is the value given by maxTransPower defined when the UE is not associated with the serving cell of the NR V2X carrier.

$P_{PowerClass,V2X}$ is the maximum output power of the terminal;

The configured maximum output powers $P_{CMAX,PSSCH}$ and $P_{CMAX,PSCCH}$ are derived from $P_{CMAX,c}$ based on a 0 dB PSD offset between PSSCH and PSCCH.

For NR V2X UEs supporting SL MIMO, the transmit power is configured for each UE.

Where $P_{CMAX,f,c}$ are the values applied to PSSCH, PSCCH, and $P_{EMAX,c}$ in the total transmit power $P_{CMAX,PSSCH/PSCCH}$ is the value given by the IE sl-maxTransPower defined in TS38.331 V17.0.0.

Disclosure of the Present Specification

This specification may be related to setting RF transmission power of a baseband channel of a direct communication or sidelink communication between devices used for vehicle-to-vehicle (V2X) communication, public safety communication, and the like. Specifically, this specification may relate to a method for configuring the transmission power of a physical sidelink feedback channel (PSFCH) of a transmission channel of a transmission terminal engaged in direct communication in conjunction with an information element (IE) configured by a radio resource control (RRC).

The IE $P_{EMAX,c}$ used to configure the transmission power of 5G NR is given as IE p-Max when transmitting/receiving between base stations and terminals, but in sidelink communication, which is direct communication between devices, it is defined differently depending on the transmitted baseband channel, frequency aggregation, transmitting multiple antenna environment (MIMO, Multiple Input Multiple Output), etc. The transmission power configuration of the existing standardized sidelink V2X terminals are as follows.

The NR V2X terminal is set to a configured maximum output power $P_{CMAX,f,c}$ in a given cell c and a given carrier f. The configured maximum output power $P_{CMAX,f,c}$ has upper and lower limits as follows.

$P_{CMAX\_L,f,c} \leq P_{CMAX,f,c} \leq P_{CMAX\_H,f,c}$
$P_{CMAX\_L,f,c} = \text{MIN} \{P_{EMAX,c}, P_{PowerClass,V2X} - \text{MAX}(\text{MAX}(MPR_c, A-MPR_c) + \Delta T_{IB,c}, P-MPR_c), P_{Regulatory,c}\}$
$P_{CMAX\_H,f,c} = \text{MIN} \{P_{EMAX,c}, P_{PowerClass,V2X}, P_{Regulatory,c}\}$ In this specification, "equations related to $P_{CMAX,f,c}$" may be interpreted as the above equations.

Wherein the $P_{CMAX,f,c}$ may be the value applied to PSSCH, PSCCH, and $P_{EMAX,c}$ may be the value given by IE sl-maxTransPower as defined in TS38.331 V17.0.0 for the total transmission power $P_{CMAX,PSSCH/PSCCH}$.

In this specification, the value given by IE sl-maxTransPower may be any value defined in TS38.331 V17.0.0.

The $P_{EMAX,c}$ will be described.

The channel transmission power of the sidelink is configured by setting the value given by sl-maxTransPower to $P_{EMAX,c}$, wherein value given by sl-maxTransPower is IE given by the base station to the terminal in the RRC message for each allocated resource pool in the case of PSSCH (Physical Sidelink Shared Channel) for data channels and PSCCH (Physical Sidelink Control Channel) for control channels. However, for 3GPP Rel-17 NR sidelinks, PSSCH/PSCCH may be configured to multiple resource pools. Even if multiple resource pools are configured, in actual transmission, if only one PSSCH/PSCCH resource pool is transmitted at a given transmission time, IE sl-maxTransPower may be used to configure the maximum transmit power of the transmitting terminal at that transmission time.

However, in the case of PSFCH, vehicle terminals, public safety communication terminals, etc. need to provide feedback on data channels received from multiple other transmitting terminals, and this feedback may be made through simultaneous transmission of PSFCH, which is multiple feedback channels spaced apart in frequency on one time axis. In other words, unlike PSSCH/PSCCH, 5G V2X terminals may transmit multiple PSFCH simultaneously at any given time.

The following description is related to the configured maximum transmission power for simultaneously transmitted PSFCHs.

Case 1. One or multiple simultaneously transmitted PSFCHs are transmitted based on one allocated resource pool.

Case 2. Multiple simultaneously transmitted PSFCHs are transmitted based on multiple allocated resource pools.

In case 1, the configured maximum transmit power of the PSFCH may be the same as the existing PSSCH/PSCCH, using the value given by IE sl-maxTransPower, which is set to one resource pool. In other words, if one PSFCH is assigned to one resource pool and transmitted, the configured maximum transmit power of the PSFCH may be the same as the configured maximum transmit power of the PSSCH/PSCCH. In addition, if multiple frequency separated PSFCHs are allocated and transmitted in one resource pool, $P_{EMAX,c}$ in the equations related to $P_{CMAX,f,c}$ for PSFCH may also be the value given by IE sl-maxTransPower. In this case, IE sl-maxTransPower may be defined as the maximum value of the sum of the transmit power of each transmitted PSFCH.

In Case 2, the configured maximum transmit power of PSFCH may be a combination of multiple IE sl-maxTransPowers corresponding to multiple configured resource pools, i.e., $P_{EMAX,c}$ in the equations related to $P_{CMAX,f,c}$ may be one of the following i to vi.
  i. the sum of multiple IE sl-maxTransPowers
  ii. the average of multiple IE sl-maxTransPowers
  iii. the maximum (or minimum) value of multiple IE sl-maxTransPowers
  iv. the sum of multiple IE sl-maxTransPowers associated with the PSSCH (and/or PSCCH) associated with the PSFCH
  v. the average of multiple IE sl-maxTransPowers associated with the PSSCH (and/or PSCCH) associated with the PSFCH
  vi. the maximum (or minimum) value of multiple IE sl-maxTransPowers associated with the PSSCH (and/or PSCCH) associated with the PSFCH For example, $P_{EMAX,c}$ may be the sum of the given IE sl-maxTransPowers for each of the multiple resource pools.

As in Case 1, if the terminal performs PSFCH transmission(s) over one resource pool, the (final/actual) power value(s) between the PSFCH transmission(s) may be distributed/determined using configured maximum transmit power (e.g., $P_{CMAX,f,c}$) derived based on a pre-configured $P_{EMAX,c}$ (=IE sl-maxTransPower) value associated with that resource pool. The resource pool may be configured with BWP specific or carrier specific.

That is, if a terminal transmits multiple PSFCHs in one resource pool, $P_{EMAX,c}$ may be the IE sl-maxTransPower value given by the RRC for the resource pool. Based on the $P_{EMAX,c}$ and the equations related to $P_{CMAX,f,c}$, $P_{CMAX,f,c}$ may be determined. Based on the determined configured maximum transmit power ($P_{CMAX,f,c}$), the terminal may transmit multiple PSFCHs simultaneously. Based on the determined configured maximum transmit power ($P_{CMAX,f,c}$), the respective power of the plurality of PSFCHs may be distributed/determined.

If, as in Case 2, the terminal transmits PSFCHs in a plurality of resource pools, the (final/actual) power values among the PSFCH transmissions may be distributed/determined using the configured maximum transmit power derived based on the proposed method described above (e.g., the sum, average, maximum value or minimum value of multiple IE sl-maxTransPowers). The resource pool may be configured with BWP-specific or carrier-specific.

For example, if this method is applied, when a terminal transmits PSFCHs over multiple resource pools, it may be interpreted that the (final/actual) PSFCH transmission power value is not determined by the configured maximum transmit power value derived from the configured $P_{EMAX,c}$ (=IE sl-maxTransPower) value associated with corresponding resource pool, but by the (resource pool common) configured maximum transmit power value derived from the configured $P_{EMAX,c}$ (=IE sl-maxTransPower) values associated with the multiple resource pools.

That is, if the terminal transmits multiple PSFCHs from multiple resource pools, $P_{EMAX,c}$ may be one of i to vi above. Based on the $P_{EMAX,c}$ and the equations related to $P_{CMAX,f,c}$, $P_{CMAX,f,c}$ may be determined. Based on the determined configured maximum transmit power ($P_{CMAX,f,c}$), the terminal may transmit a plurality of PSFCHs simultaneously. Based on the determined configured maximum transmit power ($P_{CMAX,f,c}$), the respective power of the plurality of PSFCHs may be distributed/determined.

For example, if the terminal transmits multiple PSFCHs from multiple resource pools, $P_{EMAX,c}$ may be the sum of the respective IE sl-maxTransPowers given for the multiple resource pools (method i above). Based on the $P_{EMAX,c}$ and the equations related to $P_{CMAX,f,c}$, $P_{CMAX,f,c}$ may be determined. Based on the determined configured maximum transmit power ($P_{CMAX,f,c}$), the terminal may transmit the PSFCHs simultaneously.

The IE sl-maxTransPower values for each resource pool described above may be configured equal to each other.

In the case of method i above (where $P_{EMAX,c}$ is the sum of the respective IE sl-maxTransPowers given for multiple resource pools), there may be cases where $P_{EMAX,c}$ is greater than $P_{PowerClass, V2X}$. In this case, $P_{CMAX\_H,f,c}$ cannot be $P_{EMAX,c}$ in the equations related to $P_{CMAX,f,c}$. Based on this, $P_{CMAX\_H,f,c}$ may be less than the sum of the respective IE sl-max TransPowers (PEMAX,c) given for multiple resource pools. In this case, we will discuss later how to distribute the power for each PSFCH.

When the terminal simultaneously transmits PSFCHs on multiple resource pools, a configured maximum transmit power value (P_MAX_CC) may be derived based on the proposed method described above (e.g., $P_{CMAX\_H,f,c}$ is derived based on the sum, average, maximum or minimum of the respective IE sl-max TransPowers given for multiple resource pools). The resource pool may be configured with BWP specific or carrier specific. P_MAX_CC may be $P_{CMAX,f,c}$ in some cases.

Then, by applying at least one of rules a and b below, the terminal may be configured to (finally) determine the maximum power value (named "P_MAX_POOL" for ease of description) of the PSFCH transmission per resource pool.
  a. The maximum power (P_MAX_POOL) of each of the plurality of resource pools may be value derived by distributing P_MAX_CC with the ratio of the IE sl-maxTransPower values per resource pool (and/or a preset ratio and/or an even ratio between resource pools). That is, the P_MAX_POOL value for a particular resource pool may be {P_MAX_CC*(the IE sl-maxTransPower value for the particular resource pool)/(the sum of the respective IE sl-maxTransPowers given for the plurality of resource pools)}.

b. If, after the power value of the PSFCH transmissions per resource pool is determined by applying the (common) P_MAX_CC value, the sum of the transmission power values of the PSFCH transmissions in the multiple resource pools (named "TP_MPOOL_PSFCH" for ease of explanation) exceeds the P_MAX_CC value (and/or the terminal's configured maximum transmit power value), using the ratio of the PSFCH transmit power value per resource pool (and/or the ratio of the sl-maxTransPower value per resource pool, and/or the ratio among the preset resource pools, and/or the equalized ratio), scale-down the PSFCH transmit power value per resource pool until TP_MPOOL_PSFCH does not exceed the P_MAX_CC value (and/or the terminal's configured maximum transmit power value).

This means that when a terminal transmits PSFCHs on multiple resource pools simultaneously, $P_{EMAX,c}$ may be determined as the sum of the IE sl-maxTransPowers per resource pool. $P_{CMAX,f,c}$ may be determined by substituting $P_{EMAX,c}$ into the equations related to $P_{CMAX,f,c}$. If $P_{EMAX,c}$ is greater than $P_{PowerClass, V2X}$, the maximum power of each of the plurality of resource pools (P_MAX_POOL) may be distributed by dividing P CMAX,f,c by the ratio of the IE sl-maxTransPower values per resource pool.

If the rule a and/or the rule b is applied, it may mitigate the problem that the sum of the transmit power values of PSFCHs in multiple resource pools exceeds the maximum transmit power value ($P_{Powerclass, V2X}$) (and/or the maximum transmit power value) of the terminal.

Alternatively, the network may configure the IE sl-maxTransPower value per resource pool to prevent this from occurring. Alternatively, the network may configure resource pools related to PSFCH transmission not to be overlapped (in the time and/or frequency domain).

When configuring the PSFCH transmission output power, a different relationship between $P_{EMAX,c,PSFCH}$ and IE sl-maxTransPower may be proposed depending on whether there is a single or multiple resource pools for PSFCH transmissions.

In Case 1, $P_{EMAX,c,PSFCH}$ may be the value given by IE sl-maxTransPower.

The IE sl-maxTransPower of a single transmitted PSFCH is the upper limit of its power at one frequency.

If multiple PSFCHs are transmitted simultaneously from a single resource pool, the IE sl-maxTransPower may be the sum of the upper limits of the PSFCH power at multiple frequency locations.

For Case 2, $P_{EMAX,c,PSFCH}$ is a value given by a combination of IE sl-maxTransPowers. The combination may be one of the six cases below.

$P_{EMAX,c,PSFCH}$ is the value given by the sum of multiple IE sl-maxTransPowers.

$P_{EMAX,c,PSFCH}$ is the value given by the maximum (or minimum) value of multiple IE sl-maxTransPowers.

$P_{EMAX,c,PSFCH}$ is the value given by the average of multiple IE sl-maxTransPowers.

$P_{EMAX,c,PSFCH}$ is the sum of multiple IE sl-maxTransPowers associated with the PSSCH (and/or PSCCH) associated with the PSFCH.

$P_{EMAX,c,PSFCH}$ is the average of multiple IE sl-maxTransPowers associated with the PSSCH (and/or PSCCH) associated with the PSFCH.

$P_{EMAX,c,PSFCH}$ is the maximum (or minimum) value of multiple IE sl-maxTransPowers associated with the PSSCH (and/or PSCCH) associated with the PSFCH.

For example, in Case 1, the (final/actual) power value(s) for the PSFCH transmission(s) may be distributed/determined using the configured maximum transmit power (e.g., $P_{CMAX,f,c}$) derived based on the pre-configured $P_{EMAX,c}$ (=IE sl-maxTransPower) value associated with the corresponding resource pool.

For example, in Case 2, the (final/actual) power value(s) for PSFCH transmissions may be distributed/determined using the set maximum transmit power derived based on the proposed method described above (e.g., $P_{CMAX,f,c}$ is derived based on the sum, average, maximum or minimum of the IE sl-maxTransPowers per resource pool).

If this rule is applied, when the terminal performs PSFCH transmissions over multiple resource pools, it may be interpreted that the configured maximum transmit power is not determined based on the pre-configured $P_{EMAX,c}$ (=IE sl-maxTransPower) values for corresponding resource pool (considering corresponding resource pool), but is determined based on the pre-configured $P_{EMAX,c}$ (=IE sl-maxTransPower) values for the multiple resource pools (considering multiple resource pools).

When a PSFCH is transmitted on one POOL, the $P_{CMAX,f,c}$ value for the PSFCH transmission power value may be determined using the $P_{EMAX,c}$ derived based on the IE of that POOL.

On the other hand, when multiple PSFCHs are transmitted on multiple POOLs, the $P_{EMAX,c}$ value may be determined as the sum of the IE values configured for the multiple POOLs, and the $P_{CMAx,f,c}$ values for the multiple PSFCH transmission power values may be determined using it.

The following method may be proposed.

The terminal may determine a configured maximum transmit power $P_{CMAX,f,c}$. Based on the determined configured maximum transmit power, the terminal may determine a transmission power for transmitting PSFCH ($P_{CMAX\_PSFCH}$). Based on the determined transmission power, the terminal may transmit the PSFCH to another terminal. The configured maximum transmission power $P_{CMAX,f,c}$ may be determined by the equations related to $P_{CMAX,f,c}$. The equations related to $P_{CMAX,f,c}$ may be as follows.

$P_{CMAX\_L,f,c} \leq P_{CMAX,f,c} \leq P_{CMAX\_H,f,c}$ $P_{CMAX\_L,f,c}$=MIN {$P_{EMAX,c}$, $P_{PowerClass, V2X}$−MAX(MAX (MPR$_c$, A-MPR$_c$)+$\Delta T_{IB,c}$, P-MPR$_c$), $P_{Regulatory,c}$}

$P_{CMAX\_H,f,c}$=MIN {$P_{EMAX,c}$, $P_{PowerClass, V2X}$, $P_{Regulatory,c}$}

For PSSCH and PSCCH, the transmit power may be $P_{EMAX,c}$ as given by sl-maxTransPower, an IE by the RRC per resource pool.

PSFCH may be transmitted through multiple resource pools simultaneously. When the terminal transmits PSFCHs to multiple resource pools simultaneously, $P_{EMAX,c}$ in the equations related to $P_{CMAX,f,c}$ may be the sum of the values of the respective IE sl-maxTransPower for the multiple resource pools.

For example, a first PSFCH may be transmitted over a first resource pool and a second PSFCH may be transmitted over a second resource pool. A value of IE sl-maxTransPower for the first resource pool might be IE1. A value of IE sl-maxTransPower for the second resource pool may be IE2. $P_{EMAX}$ may be IE1+IE2.

If the sum of the IE sl-maxTransPower values of each of the plurality of resource pools ($P_{EMAX,c}$) exceeds the above $P_{PowerClass, V2X}$, then $P_{EMAX,c}$ may not be reflected in $P_{CMAX\_H,f,c}$. Then, the sum of all the IE sl-maxTransPower values of each of the plurality of resource pools ($P_{EMAX,c}$) may be greater than the maximum transmit power $P_{CMAX,f,c}$. Then, transmission in each of the plurality of resource pools may not be transmission of the PSFCH with the maximum transmit power given by the RRC as IE sl-maxTransPower.

In this case, the determined maximum transmit power $P_{CMAX,f,c}$ may be distributed as a ratio of the IE sl-maxTransPower values per resource pool, i.e., the maximum transmission power for a specific resource pool may be {$P_{CMAX,f,c}$*(the IE sl-maxTransPower value of the specific resource pool)/(the sum of the respective IE sl-maxTransPowers given for the plurality of resource pools)}.

Alternatively, the determined maximum transmit power $P_{CMAX,f,c}$ may be distributed equally among the resource pools, i.e., the maximum transmit power for a specific resource pool may be {PCMAX,f,c/(number of resource pools)}.

A maximum output power may be determined.

Based on the maximum output power, the UE may simultaneously transmit a physical sidelink feedback channel (PSFCH) to another UE via the plurality of resource pools.

The maximum output power may be configured based on a plurality of individual maximum transmission powers for each of the plurality of resource pools.

One individual maximum transmission power of the plurality of individual maximum transmission powers may be a maximum value of the transmission power when the sidelink transmission is performed from only one specific resource pool.

The maximum output power may be configured based on the sum of the plurality of individual maximum transmission powers.

The maximum output power may be configured based on a maximum transmission power according to a power class of the UE.

The step of transmitting the PSFCH by the UE based on the sum of said plurality of individual maximum transmit powers exceeding the maximum transmit power according to the power class:

Based on the maximum power allocated for one of the plurality of resource pools being equal to said maximum output power multiplied by the individual maximum transmit power of one of the plurality of individual maximum transmit powers and divided by the sum of the plurality of individual maximum transmit powers, the step of the UE transmitting the PSFCH over the resource pool of one of said plurality of resource pools may comprise the step of the UE transmitting said PSFCH.

The maximum output power may be configured based on a maximum of the plurality of individual maximum transmit powers.

The maximum output power may be configured based on a minimum value of the plurality of individual maximum transmit powers.

The maximum output power may be configured based on an average value of the plurality of individual maximum transmission powers.

The following drawings are made to explain a specific example of the present specification. Since the names of specific devices or names of specific signals/messages/fields described in the drawings are provided as examples, the technical features of the present specification are not limited to the specific names used in the drawings below.

FIG. 8 Shows a Procedure of a UE According to the Disclosure of the Present Specification.

1. The UE may determine a configured maximum output power.

2. The UE may transmit, to another UE, PSFCH (Physical Sidelink Feedback Channel) on a first resource pool and a second resource pool at a same time, based on the configured maximum output power.

The configured maximum output power may be configured, based on a maximum transmission power for the first resource pool and a maximum transmission power for the second resource pool.

The maximum transmission power for the first resource pool may be a maximum value of transmission power when sidelink transmission is performed only on the first resource pool.

The maximum transmission power for the second resource pool may be a maximum value of transmission power when sidelink transmission is performed only on the second resource pool.

The configured maximum output power may be configured, based on sum of the maximum transmission power for the first resource pool and the maximum transmission power for the second resource pool.

The configured maximum output power may be configured based on a maximum transmission power based on power class of the UE.

Based on the sum of the maximum transmission power for the first resource pool and the maximum transmission power for the second resource pool being higher than the maximum transmission power based on power class of the UE, the step of transmitting the PSFCH may comprise:

transmitting, to the another UE, the PSFCH base on allocated maximum power for the first resource pool;
transmitting, to the another UE, the PSFCH base on allocated maximum power for the second resource pool, The allocated maximum power for the first resource pool may be 'the configured maximum output power' multiplied by 'the maximum transmission power for the first resource pool' divided by 'the sum of the maximum transmission power for the first resource pool and the maximum transmission power for the second resource pool'.

The allocated maximum power for the second resource pool may be 'the configured maximum output power' multiplied by 'the maximum transmission power for the second resource pool' divided by 'the sum of the maximum transmission power for the first resource pool and the maximum transmission power for the second resource pool'.

The configured maximum output power may be configured, based on a maximum value among the maximum transmission power for the first resource pool and the maximum transmission power for the second resource pool.

The configured maximum output power may be configured, based on a minimum value among the maximum transmission power for the first resource pool and the maximum transmission power for the second resource pool.

The configured maximum output power may be configured, based on average value of the maximum transmission power for the first resource pool and the maximum transmission power for the second resource pool.

Hereinafter, a processor of the UE for providing communication according to some embodiments of the present specification will be described.

The processor may perform: determining a configured maximum output power; transmitting, to another UE, on a first resource pool and a second resource pool at a same time, based on the configured maximum output power, wherein the configured maximum output power is configured, based on a maximum transmission power for the first resource pool and a maximum transmission power for the second resource pool, wherein the maximum transmission power for the first resource pool is a maximum value of transmission power when sidelink transmission is performed only on the first resource pool, wherein the maximum transmission power for the second resource pool is a maximum value of transmission power when sidelink transmission is performed only on the second resource pool.

Hereinafter, a non-volatile computer readable medium storing one or more instructions for providing multicast service in wireless communication according to some embodiments of the present specification will be described.

According to some embodiments of the present disclosure, the technical features of the present disclosure may be directly implemented as hardware, software executed by a processor, or a combination of the two. For example, in wireless communication, a method performed by a wireless device may be implemented in hardware, software, firmware, or any combination thereof. For example, the software may reside in RAM memory, flash memory, ROM memory, EPROM memory, EEPROM memory, registers, hard disk, removable disk, CD-ROM, or other storage medium.

Some examples of a storage medium are coupled to the processor such that the processor can read information from the storage medium. Alternatively, the storage medium may be integrated into the processor. The processor and storage medium may reside in the ASIC. For another example, a processor and a storage medium may reside as separate components.

Computer-readable media can include tangible and non-volatile computer-readable storage media.

For example, non-volatile computer-readable media may include random access memory (RAM), such as synchronization dynamic random access memory (SDRAM), read-only memory (ROM), or non-volatile random access memory (NVRAM). Read-only memory (EEPROM), flash memory, magnetic or optical data storage media, or other media that can be used to store instructions or data structures or Non-volatile computer readable media may also include combinations of the above.

Further, the methods described herein may be realized at least in part by computer-readable communication media that carry or carry code in the form of instructions or data structures and that can be accessed, read, and/or executed by a computer.

According to some embodiments of the present disclosure, a non-transitory computer-readable medium has one or more instructions stored thereon. The stored one or more instructions may be executed by a processor of the UE.

The stored one or more instructions cause the processors to: determining a configured maximum output power; transmitting, to another UE, on a first resource pool and a second resource pool at a same time, based on the configured maximum output power, wherein the configured maximum output power is configured, based on a maximum transmission power for the first resource pool and a maximum transmission power for the second resource pool, wherein the maximum transmission power for the first resource pool is a maximum value of transmission power when sidelink transmission is performed only on the first resource pool, wherein the maximum transmission power for the second resource pool is a maximum value of transmission power when sidelink transmission is performed only on the second resource pool.

The present specification may have various effects.

For example, if a terminal transmits PSFCH using multiple resource pools, the maximum output power of the terminal can be proposed to ensure and commercialize sidelink communication.

Effects that can be obtained through specific examples of the present specification are not limited to the effects listed above. For example, various technical effects that a person having ordinary skill in the related art can understand or derive from this specification may exist. Accordingly, the specific effects of the present specification are not limited to those explicitly described herein, and may include various effects that can be understood or derived from the technical characteristics of the present specification.

The claims described herein may be combined in various ways. For example, the technical features of the method claims of the present specification may be combined and implemented as an apparatus, and the technical features of the apparatus claims of the present specification may be combined and implemented as a method. In addition, the technical features of the method claim of the present specification and the technical features of the apparatus claim may be combined to be implemented as an apparatus, and the technical features of the method claim of the present specification and the technical features of the apparatus claim may be combined and implemented as a method. Other implementations are within the scope of the following claims.

What is claimed is:

1. A method for performing communication, by a UE (User Equipment), comprising:
   determining a configured maximum output power;
   transmitting, to another UE, PSFCH (Physical Sidelink Feedback Channel) on a first resource pool and a second resource pool at a same time, based on the configured maximum output power,
   wherein the configured maximum output power is configured, based on sum of a maximum transmission power for the first resource pool and a maximum transmission power for the second resource pool,
   wherein the maximum transmission power for the first resource pool is a maximum value of transmission power when sidelink transmission is performed only on the first resource pool,
   wherein the maximum transmission power for the second resource pool is a maximum value of transmission power when sidelink transmission is performed only on the second resource pool.

2. The method of claim 1,
   wherein the configured maximum output power is configured based on a maximum transmission power based on power class of the UE,
   wherein, based on the sum of the maximum transmission power for the first resource pool and the maximum transmission power for the second resource pool being higher than the maximum transmission power based on power class of the UE, the step of transmitting the PSFCH comprising:
   transmitting, to the another UE, the PSFCH base on allocated maximum power for the first resource pool;
   transmitting, to the another UE, the PSFCH base on allocated maximum power for the second resource pool,
   wherein the allocated maximum power for the first resource pool is 'the configured maximum output power' multiplied by 'the maximum transmission power for the first resource pool' divided by 'the sum of the maximum transmission power for the first resource pool and the maximum transmission power for the second resource pool', wherein the allocated maximum power for the second resource pool is 'the configured maximum output power' multiplied by 'the maximum transmission power for the second resource pool' divided by 'the sum of the maximum transmission power for the first resource pool and the maximum transmission power for the second resource pool'.

3. The method of claim 1,
wherein the configured maximum output power is configured, based on a maximum value among the maximum transmission power for the first resource pool and the maximum transmission power for the second resource pool.

4. The method of claim 1,
wherein the configured maximum output power is configured, based on a minimum value among the maximum transmission power for the first resource pool and the maximum transmission power for the second resource pool.

5. The method of claim 1,
wherein the configured maximum output power is configured, based on average value of the maximum transmission power for the first resource pool and the maximum transmission power for the second resource pool.

6. A UE (User Equipment) to perform communication, comprising:
a transceiver; and
a processor,
wherein the processor performs operation comprising:
determining a configured maximum output power;
transmitting, to another UE, PSFCH (Physical Sidelink Feedback Channel) on a first resource pool and a second resource pool at a same time, based on the configured maximum output power,
wherein the configured maximum output power is configured, based on sum of a maximum transmission power for the first resource pool and a maximum transmission power for the second resource pool,
wherein the maximum transmission power for the first resource pool is a maximum value of transmission power when sidelink transmission is performed only on the first resource pool,
wherein the maximum transmission power for the second resource pool is a maximum value of transmission power when sidelink transmission is performed only on the second resource pool.

7. The UE of claim 6,
wherein the configured maximum output power is configured based on a maximum transmission power based on power class of the UE,
wherein, based on the sum of the maximum transmission power for the first resource pool and the maximum transmission power for the second resource pool being higher than the maximum transmission power based on power class of the UE, the step of transmitting the PSFCH comprising:
transmitting, to the another UE, the PSFCH base on allocated maximum power for the first resource pool;
transmitting, to the another UE, the PSFCH base on allocated maximum power for the second resource pool,
wherein the allocated maximum power for the first resource pool is 'the configured maximum output power' multiplied by 'the maximum transmission power for the first resource pool' divided by 'the sum of the maximum transmission power for the first resource pool and the maximum transmission power for the second resource pool',
wherein the allocated maximum power for the second resource pool is 'the configured maximum output power' multiplied by 'the maximum transmission power for the second resource pool' divided by 'the sum of the maximum transmission power for the first resource pool and the maximum transmission power for the second resource pool'.

8. The UE of claim 6,
wherein the configured maximum output power is configured, based on a maximum value among the maximum transmission power for the first resource pool and the maximum transmission power for the second resource pool.

9. The UE of claim 6,
wherein the configured maximum output power is configured, based on a minimum value among the maximum transmission power for the first resource pool and the maximum transmission power for the second resource pool.

10. The UE of claim 6,
wherein the configured maximum output power is configured, based on average value of the maximum transmission power for the first resource pool and the maximum transmission power for the second resource pool.

11. An apparatus in mobile communication, comprising:
at least one processor; and
at least one memory storing instructions and operably electrically connectable with the at least one processor, based on the instructions being operated by the at least one processor, performed operation comprising:
determining a configured maximum output power;
transmitting, to another UE, PSFCH (Physical Sidelink Feedback Channel) on a first resource pool and a second resource pool at a same time, based on the configured maximum output power,
wherein the configured maximum output power is configured, based on sum of a maximum transmission power for the first resource pool and a maximum transmission power for the second resource pool,
wherein the maximum transmission power for the first resource pool is a maximum value of transmission power when sidelink transmission is performed only on the first resource pool,
wherein the maximum transmission power for the second resource pool is a maximum value of transmission power when sidelink transmission is performed only on the second resource pool.

* * * * *